(12) United States Patent
Kodandaramaiah et al.

(10) Patent No.: US 12,094,161 B2
(45) Date of Patent: Sep. 17, 2024

(54) MULTI-PERSPECTIVE MICROSCOPIC IMAGING GUIDED MICROINJECTION OF MICROSCOPIC OBJECTS ACROSS LARGE FIELD OF VIEWS

(71) Applicant: Regents of the University of Minnesota, Minneapolis, MN (US)

(72) Inventors: Suhasa B Kodandaramaiah, St Paul, MN (US); Daryl M. Gohl, Minneapolis, MN (US); Andrew Alegria, Minneapolis, MN (US); Amey S Joshi, Minneapolis, MN (US); Benjamin Auch, Saint Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 275 days.

(21) Appl. No.: 17/656,130

(22) Filed: Mar. 23, 2022

(65) Prior Publication Data

US 2022/0309705 A1    Sep. 29, 2022

Related U.S. Application Data

(60) Provisional application No. 63/200,721, filed on Mar. 24, 2021.

(51) Int. Cl.
*G06T 7/73* (2017.01)
*G06T 3/40* (2006.01)

(52) U.S. Cl.
CPC .............. *G06T 7/74* (2017.01); *G06T 3/40* (2013.01); *G06T 2207/10012* (2013.01); *G06T 2207/20084* (2013.01)

(58) Field of Classification Search
CPC ... G06T 7/74; G06T 3/40; G06T 2207/10012; G06T 2207/20084; G06T 2207/10056;
(Continued)

(56) References Cited

U.S. PATENT DOCUMENTS 7,881,533 B2   2/2011   Ando
8,173,415 B2   5/2012   Noori et al.
(Continued)

FOREIGN PATENT DOCUMENTS

WO    2008/034249 A1    3/2008

OTHER PUBLICATIONS

"Ogshull/Autoinjector" retrieved from https://github.com/ogshull/Autoinjector- on Jul. 22, 2020, 7 pp.
(Continued)

*Primary Examiner* — Md K Talukder
(74) *Attorney, Agent, or Firm* — Shumaker & Sieffert, P.A.

(57) ABSTRACT

Techniques are described for automated microinjection of substances, such as genetic material, into microscopic objects, such as embryos. An example system includes a pressure controller, a stereoscopic imaging apparatus, a first camera, a second camera, and a computing system. The computing system is configured to apply one or more computer vision algorithms that determine, based on image data generated by the stereoscopic imaging apparatus, first camera, and second camera, a location of a tip of a micropipette and a location of a particular microscopic object in three-dimensional space. The computing system is further configured to control the pressure controller to cause the micropipette to eject the substance from the tip of the micropipette and into the particular microscopic object.

20 Claims, 9 Drawing Sheets

(58) Field of Classification Search
CPC . G06T 2207/20081; G06T 2207/30024; G06T 7/73; H04N 23/90; H04N 23/959
See application file for complete search history.

(56) References Cited

U.S. PATENT DOCUMENTS

| | | | |
|---|---|---|---|
| 8,990,023 | B2 | 3/2015 | Sun et al. |
| 9,668,804 | B2 | 6/2017 | Kodandaramaiah et al. |
| 10,596,541 | B2 | 3/2020 | Weitz et al. |
| 11,347,046 | B2* | 5/2022 | Moore .................. G06T 7/0012 |
| 11,712,549 | B2* | 8/2023 | Rand ...................... B33Y 10/00 604/46 |
| 2008/0077329 | A1 | 3/2008 | Sun |
| 2011/0027885 | A1 | 2/2011 | Sun et al. |
| 2012/0225435 | A1 | 9/2012 | Seger et al. |
| 2014/0309795 | A1* | 10/2014 | Norton ............... G01N 15/1404 700/282 |
| 2016/0051353 | A1 | 2/2016 | Yanik et al. |
| 2019/0127782 | A1 | 5/2019 | Regev et al. |
| 2020/0308531 | A1 | 10/2020 | Kodandaramaiah et al. |
| 2022/0309705 | A1* | 9/2022 | Kodandaramaiah ... H04N 23/90 |
| 2023/0101853 | A1* | 3/2023 | Kodandaramaiah ... C12M 23/16 435/395 |
| 2024/0090846 | A1* | 3/2024 | Lee ........................... G06T 7/70 |

OTHER PUBLICATIONS

"scripy.interpolate.UnivariateSpline." SciPy: Open Source Scientific Tools for Python, retrieved from https://docs.scipy.org/doc/scipy/reference/generated/scipy.interpolate.UnivariateSpline.html, on Jul. 22, 2020, 3 pp.

Abramoff et al., "Image Processing with ImageJ," Biophotonics International, vol. 11, No. 7, Jul. 2004, 7 pp.

Alegria et al., "Single neuron recording: progress towards high-throughput analysis," Future Medicine Ltd, Bioelectronics in Medicine, vol. 3, No. 3, doi: 10.2217/bem-2020-0011, Sep. 17, 2020, pp. 33-36.

Arnold et al., "The T-box transcription factor Eomes/Tbr2 regulates neurogenesis in the cortical subventricular zone," Genes & Development, vol. 22, No. 18, Jul. 2008, 6 pp.

Attardo et al., "Live Imaging at the Onset of Cortical Neurogenesis Reveals Differential Appearance of the Neuronal Phenotype in Apical versus Basal Progenitor Progeny," PLoS One, vol. 3, No. 6, Jun. 2008, 16 pp.

Bahrey et al., "Voltage-gated Currents, Dye and Electrical Coupling in the Embryonic Mouse Neocortex," Cerebral Cortex, vol. 13, No. 3, Mar. 2003, 13 pp.

Bassett et al., Highly Efficient Targeted Mutagenesis of *Drosophila* with the CRISPR/Cas9 System, Cell Reports, vol. 4, No. 1, Jul. 2013, pp. 220-228.

Becattini et al., "A Fully Automated System for Adherent Cells Microinjection," IEEE Journal of Biomedical and Health Informatics, vol. 18, No. 1, Jan. 2014, 11 pp.

Caccamo et al, "An Immunohistochemical Characterization of the Primitive and Maturing Neuroepithelial Components in the OTT-6050 Transplantable Mouse Teratoma," Neuropathology and Applied Neurobiology, vol. 15: Mar. 1989, 17 pp.

Canny, "A Computational Approach to Edge Detection," IEEE Transactions on Pattern Analysis and Machine Intelligence , vol. 8, No. 6, doi: 10.1109/TPAMI.1986.4767851, Dec. 1986, pp. 679-698.

Chang et al., "Organ-Targeted High-Throughput In Vivo Biologics Screen Identifies Materials for RNA Delivery," Integrative Biology: Quantitative Biosciences from Nano to Macro, vol. 6, No. 10, Oct. 2014, 17 pp.

Chow et al., "A High-Throughput Automated Microinjection System for Human Cells with Small Size," IEEE/ASME Transactions on Mechatronics, vol. 21, No. 2,doi:10.1109/TMECH.2015.2476362, Apr. 2016, pp. 838-850.

Clavaguera et al., "Transmission and spreading of tauopathy in transgenic mouse brain," Nature Cell Biology, vol. 11, No. 7, Jul. 2009, 15 pp.

Costa et al., "Continuous live imaging of adult neural stem cell division and lineage progression in vitro," Development (Cambridge, England), vol. 138, No. 6, Mar. 2011, 12 pp.

Dean, "Microinjection," Brenner's Encyclopedia of Genetics, 2nd Edition, vol. 4, doi:1 0.1016/8978-0-12-374984-0.00945-1, May 2013, pp. 409-410.

Delubac et al., "Microfluidic system with integrated microinjector for automated *Drosophila* embryo injection," The Royal Society of Chemistry, Lab Chip, vol. 12, DOI: 10.1039/c21c40104e, Sep. 2012, pp. 4911-4919.

Dietzl et al., "A genome-wide transgenic RNAi library for conditional gene inactivation in *Drosophila*," Nature, vol. 448, No. 7150, doi: 10.1038/nature05954, Jul. 2007, pp. 151-157.

Farkas et al., "The cell biology of neural stem and progenitor cells and its significance for their proliferation versus differentiation during mammalian brain development," Current Opinion in Cell Biology, vol. 20, No. 6, Dec. 2008, 9 pp.

Fitzharris et al., "Electrical-assisted microinjection for analysis of fertilization and cell division in mammalian oocytes and early embryos [Chapter 19]," Elsevier Inc., Methods in Cell Biology, 1st ed., vol. 144, https://doi.org/10.1016/bs.mcb.2018.03.036, May 2018, pp. 431-440.

Florio et al., "A single splice site mutation in human-specific ARHGAP11B causes basal progenitor amplification," Science Advances, vol. 2, No. 12, Dec. 2016, 8 pp.

Gompel et al., "*Drosophila* germline transformation," retrieved from http://gompel.org/wp-content/uploads/2015/12/Drosophila-transformation-with-chorion.pdf, Oct. 2015, 11 pp.

Gong et al., "Ends-out, or replacement, gene targeting in *Drosophila*," Proceedings of the National Academy of Sciences, PNAS, vol. 100, No. 5, Mar. 2003, pp. 2556-2561.

Gratz et al., "Genome Engineering of *Drosophila* with the CRISPR RNA-Guided Cas9 Nuclease," Genetics Society of America, Genetics, vol. 194, No. 4, Aug. 2013, pp. 1029-1035.

Kalebic et al., "CRISPR/Cas9-induced disruption of gene expression in mouse embryonic brain and single neural stem cells in vivo," EMBO Reports, vol. 17, No. 3, Jan. 2016, 11 pp.

Khosla et al., "Gold Nanorod Induced Warming of Embryos from Cryogenic State Enhances Viability," American Chemical Society, ACS Nano, vol. 11, No. 8, doi:10.1021/acsnano.7b02216, Jul. 2017, pp. 7869-7878.

Kim et al., "A functional genomic screen for cardiogenic genes using RNA interference in developing *Drosophila* embryos," Proceedings of the National Academy of Sciences, PNAS, vol. 101, No. 1, Jan. 2004, pp. 159-164.

Kimmel et al., "Stages of Embryonic Development of the Zebrafish," Wiley-Liss, Inc., Developmental Dynamics, vol. 203, No. 3, doi: 10.1002/aja. 1002030302, Jul. 1995, pp. 253-310.

Kodandaramaiah et al., "Automated whole-cell patch-clamp electrophysiology of neurons in vivo," Nature Methods, vol. 9, No. 6, Jun. 2012, 13 pp.

Kodandaramaiah et al., "Multi-neuron intracellular recording in vivo via interacting autopatching robots," eLife, vol. 7, Jan. 2018, 19 pp.

Kodandaramaiah et al., "Setting up and using the autopatcher for automated intracellular neural recording in vivo," Nature Protocols, vol. 11, No. 4, Apr. 2016, 44 pp.

Lacar et al., "Gap junction-mediated calcium waves define communication networks among murine postnatal neural progenitor cells," European Journal of Neuroscience, vol. 34, No. 12, Dec. 2011, 16 pp.

Lawson et al., "In Vivo Imaging of Embryonic Vascular Development Using Trasngenic Zebrafish," Developmental Biology, vol. 248, No. 2, doi:10.1006/dbio.2002.0711, Aug. 2002, pp. 307-318.

Lee et al., "Development of a transient expression assay for detecting environmental oestrogens in zebrafish and medaka embryos," BMC Biotechnology, vol. 12, No. 32, doi: 10.1186/1472-6750-12-32, Jun. 2012, pp. 1-12.

(56) References Cited

OTHER PUBLICATIONS

Liu et al., "Gap Junctions/Hemichannels Modulate Interkinetic Nuclear Migration in the Forebrain Precursor,". Journal of Neuroscience, vol. 30, No. 12, Mar. 2010, 13 pp.
Lui et al., "Development and Evolution of the Human Neocortex," Cell, vol. 146, No. 1, Jul. 2011, 19 pp.
Millman et al., "Python for Scientists and Engineers," Computing in Science & Engineering, vol. 13, Mar./Apr. 2011, 4pp.
Miyata et al., "Asymmetric production of surface-dividing and non-surface-dividing cortical progenitor cells," Development (Cambridge, England), vol. 131, No. 13, Jul. 2004, 13 pp.
Molotkov et al., "Gene Delivery to Postnatal Rat Brain by Non-ventricular Plasmid Injection and Electroporation," Journal of Visualized Experiments, vol. 43, Sep. 2010, 4 pp.
Nan et al., "Depth Detection for a Stereo Cell Micro-injection System with Dual Cameras," 2017 IEEE International Conference on Robotics and Biomimetics, ROBIO 2017, doi:10.1109/ROBIO.2017.8324565, Dec. 5-8, 2017, pp. 1-6.
Pech-Pacheco et al., "Diatom autofocusing in brightfield microscopy: a comparative study," IEEE, Proceedings 15th International Conference on Pattern Recognition. ICPR-2000, vol. 3, doi: 10.1109/ICPR.2000.903548, Feb. 2000, pp. 314-317.
Permana et al., "A Review of Automated Microinjection Systems for Single Cells in the Embryogenesis Stage," IEEE/ASME Transactions on Mechatronics, vol. 21, No. 5, Oct. 2016, 14 pp.
Rakic, P., "Evolution of the neocortex: a perspective from developmental biology," Nature Reviews Neuroscience, vol. 10, No. 10, Oct. 2009, 28 pp.
Ren et al., "Faster R-CNN: Towards Real-Time Object Detection with Region Proposal Networks," arXiv, accessed from https://arxiv.org/abs/1506.01497v1, Jun. 2015, 10 pp.
Ringrose et al.,"Chapter 1—Transgenesis in Drosophila melanogaster," Transgenesis Techniques, Methods in Molecular Biology, vol. 561, doi:10.1007/978-1-60327-019-9, (Applicant points out, in accordance with MPEP 609.04(a), that the year of publication, 2009, is sufficiently earlier than the effective U.S. filing date, so that the particular month of publication is not in issue.), 2009, pp. 3-19.
Rosen et al., "Microinjection of Zebrafish Embroys to Analyze Gene Function," Journal of Visualized Experiments and Gene Tools, vol. 25, e1115, doi:10.3791/1115, Mar. 2009, 5 pp.
Rubin et al., "Genetic Transformation of Drosophila with Transposable Element Vectors," Science, vol. 218, No. 4570, Oct. 1982, pp. 348-353.
Savall et al., "Dexterous robotic manipulation of alert adult Drosophila for high-content experimentation," Nature Methods, vol. 12, No. 7, Jul. 2015, 13 pp.
Schindelin et al., "Fiji: an open-source platform for biological-image analysis," Nature Methods, vol. 9, No. 7, Jul. 2012, 7 pp.
Schubert et al., "Microinjection into zebrafish embryos (Danio rerio)—a useful tool in aquatic toxicity testing?," Environmental Sciences Europe, vol. 26, No. 32, doi: 10.1186/s12302-014-0032-3, Dec. 2014, 9 pp.
Schwamborn et al., "The sequential activity of the GTPases Rap1B and Cdc42 determines neuronal polarity," Nature Neuroscience, vol. 7, No. 9, Aug. 2004, 7 pp.
Shull et al., "Manipulation of Single Neural Stem Cells and Neurons in Brain Slices using RObotic Microinjection," JOVE, jove.com/video/61599, vol. 167, e61599, doi: 10.3791/61599, Jan. 2021, pp. 1-15.
Shull et al., "Robotic platform for microinjection into single cells in brain tissue," EMBO Reports, vol. 20, No. 10, e47880, doi:10.15252/embr.201947880, Aug. 2019, pp. 1-16.
Spradling et al., "Transposition of Cloned P Elements into Drosophila Germ Line Chromosomes," Science, vol. 218, No. 4570, doi:10.1126/science.6289435, Oct. 22, 1982, pp. 341-347.
Sreedhar et al., "Enhancement of Images Using Morphological Transformations," International Journal of Computer Science & Information Technology (IJCSIT), vol. 4, No. 1, DOI : 10.5121/ijcsit.2012.4103, Feb. 2012, pp. 33-50.

Suk et al., "Closed-Loop Real-Time Imaging Enables Fully Automated Cell-Targeted Patch-Clamp Neural Recording In Vivo," Cell Press, Neuron, vol. 95, No. 5, doi:10.1016/j.neuron.2017.08.011, Aug. 2017, pp. 1037-1047.
Suk et al., "Closed-Loop Real-Time Imaging Enables Fully Automated Cell-Targeted Patch-Clamp Neural Recording In Vivo," Neuron, vol. 95, No. 5, Aug. 2017, 21 pp.
Sun et al., "Biological Cell Injection Using an Autonomous MicroRobotic System," The International Journal of Robotics Research, vol. 21, No. 10-11, Oct.-Nov. 2002, 8 pp.
Takahashi et al., "Manipulating gene expressions by electroporation in the developing brain of mammalian embryos," Differentiation, vol. 70, No. 4-5, Jun. 2002, 8 pp.
Tavano et al., "Insm1 Induces Neural Progenitor Delamination in Developing Neocortex via Downregulation of the Adherens Junction Belt-Specific Protein Plekha7," Neuron, vol. 97, Mar. 2018, 39 pp.
Taverna et al., "A new approach to manipulate the fate of single neural stem cells in tissue," Nature neuroscience, vol. 15, No. 2, Dec. 2011, 11 pp.
U.S. Appl. No. 17/935,494, filed Sep. 26, 2022, naming inventors Kodandaramaiah et al.
Venken et al., "Genetic Manipulation of Genes and Cells in the Nervous System of the Fruit Fly," Cell Press, Neuron, vol. 72, No. 2, doi: 10.1016/j.neuron.2011.09.021, Oct. 2011, pp. 202-230.
Wong et al., "Microinjection of membrane-impermeable molecules into single neural stem cells in brain tissue," Nature Protocols, vol. 9, No. 5, Apr. 2014, 13 pp.
Wu et al., "Integration of autopatching with automated pipette and cell detection in vitro," American Physiological Society, Journal of Neurophysiology, vol. 116, No. 4, doi: 10.1152/jn.00386.2016, Jul. 2016, pp. 1564-1578.
Wu et al., "Integration of autopatching with automated pipette and cell detection in vitro," Journal of Neurophysiology, vol. 116, No. 4, Oct. 2016, 15 pp.
Xu, "Chapter 10—Visual Servo Control with Force Regulation for Microinjection," Springer International Publishing AG, Micromachines for Biological Micromanipulation, doi.org/10.1007/978-3-319-74621-0_10, Feb. 3, 2018, pp. 209-223.
Zappe et al., "Automated MEMS-based Drosophila embryo injection system for high-throughput RNAi screens," The Royal Society of Chemistry, Lab Chip, vol. 6, DOI: 10.1039/b600238b, Jun. 2006, pp. 1012-1019.
Zhao et al., "A Review of Automated Microinjection of Zebrafish Embryos," MDPI, Micromachines, vol. 10, No. 7, doi: 10.3390/mi10010007, Dec. 24, 2018, 26 pp.
Annecchino et al., "Robotic Automation of In Vivo Two-Photon Targeted Whole-Cell Patch-Clamp Electrophysiology," Neuron, vol. 95, No. 5, Aug. 2017, pp. 1048-1055.
Asp et al., "Spatially Resolved Transcriptomes-Next Generation Tools for Tissue Exploration," BioEssays, vol. 42, No. 10, May 4, 2020, 16 pp.
Behjati et al., "What is Next Generation Sequencing?," Arch. Dis. Child. Educ. Pract. Ed., vol. 98, No. 6, Dec. 2013, pp. 236-238.
Cadwell et al., "Electrophysiological, Transcriptomic and Morphologic Profiling of Single Neurons using Patch-Seq," Nat. Biotechnol., vol. 34, No. 2, Feb. 2016, 19 pp.
Delpiano et al., "Automated Detection of Fluorescent Cells In In-Resin Fluorescence Sections for Integrated Light and Electron Microscopy," J. Microsc., vol. 271, No. 1, pp. 109-119, Jul. 2018.
Gonzalez et al., "Machine Learning-Based Pipette Positional Correction for Automatic Patch Clamp In Vitro," eNeuro, vol. 8, No. 4, Jul. 2021, 8 pp.
Gurcan et al., "Histopathological Image Analysis: A Review," IEEE Rev. Biomed. Eng., vol. 2, Oct. 30, 2009, pp. 147-171.
Harder et al., "Automated Analysis of the Mitotic Phases of Human Cells in 3D Fluorescence Microscopy Image Sequences," in Medical Image Computing and Computer-Assisted Intervention—MICCAI 2006, Feb. 2006, pp. 840-848.
Holst et al., "Autonomous Patch-Clamp Robot for Functional Characterization of Neurons in Vivo: Development and Application to Mouse Visual Cortex," J. Neurophysiol., vol. 121, No. 6, Jun. 2019, pp. 2341-2357.

(56) References Cited

OTHER PUBLICATIONS

Hwang et al., "Single-Cell RNA Sequencing Technologies and Bioinformatics Pipelines," Exp. Mol. Med., vol. 50, No. 8, Aug. 2018, 14 pp.

Irshad et al., "Methods for Nuclei Detection, Segmentation, and Classification in Digital Histopathology: A Review—Current Status and Future Potential," IEEE Rev. Biomed. Eng., vol. 7, May 2014, pp. 97-114.

Kolb et al., "PatcherBot: a Single-Cell Electrophysiology Robot for Adherent Cells and Brain Slices," J. Neural Eng., vol. 16, No. 4, Aug. 2019, 13 pp.

Koos et al., "Automatic Deep Learning-Driven Label-Free Image-Guided Patch Clamp System," Nat. Commun., vol. 12, No. 1, Feb. 2021, 12 pp.

Li et al., "A Robot for High Yield Electrophysiology and Morphology of Single Neurons in Vivo," Nat. Commun., vol. 8, No. 1, Jun. 2017, 10 pp.

Long et al., "3D Image-Guided Automatic Pipette Positioning for Single Cell Experiments in Vivo," Scientific Reports, vol. 5, No. 1, Dec. 2015. 8 pp.

Mateos-Pérez et al., "Comparative Evaluation of Autofocus Algorithms for a Real-Time System for Automatic Detection of *Mycobacterium tuberculosis*," Cytometry A, vol. 81A, No. 3, Jan. 2012, pp. 213-221.

O'Brien et al., "Robotic Barcode Tagging of Single Cells in Intact Tissue for Spatial and Functional Transcriptomics," 2020 IEM Annual Conference—Poster Session, 2020 (Applicant points out, in accordance with MPEP 609.04(a), that the year of publication, 2020, is sufficiently earlier than the effective U.S. filing date, so that the particular month of publication is not in issue.), 6 pp.

O'Brien, "Improved Computer Vision Algorithms for High-Throughput Targeting of Single Cells in Intact Tissue for Automated Microinjections," University of Minnesota, Oct. 2021, 148 pp.

Pertuz et al., "Analysis of Focus Measure Operators for Shape-From-Focus," Pattern Recognit., vol. 46, No. 5, May 2013, pp. 1415-1432.

Simon, "Optimal State Estimation: Kalman, H Infinity, and Nonlinear Approaches," John Wiley & Sons, 2006 (Applicant points out, in accordance with MPEP 609.04(a), that the year of publication, 2006, is sufficiently earlier than the effective U.S. filing date, so that the particular month of publication is not in issue.), 530 pp.

Stahl et al., "Visualization and Analysis of Gene Expression in Tissue Sections by Spatial Transcriptomics," Science, vol. 353, No. 6294, Jul. 2016, pp. 78-82.

Stoeckius et al., "Cell Hashing with Barcoded Antibodies Enables Multiplexing and Doublet Detection for Single Cell Genomics," Genome Biology, vol. 19, No. 224, Dec. 19, 2018, 12 pp.

Sun et al., "Autofocusing in Computer Microscopy: Selecting the Optimal Focus Algorithm," Microscopy Research and Technique, vol. 65, Oct. 2005, pp. 139-149.

Yip et al., "Deep Learning-Based Real-Time Detection of Neurons in Brain Slices for in Vitro Physiology," Sci. Rep., vol. 11, No. 1, Mar. 2021, 10 pp.

\* cited by examiner

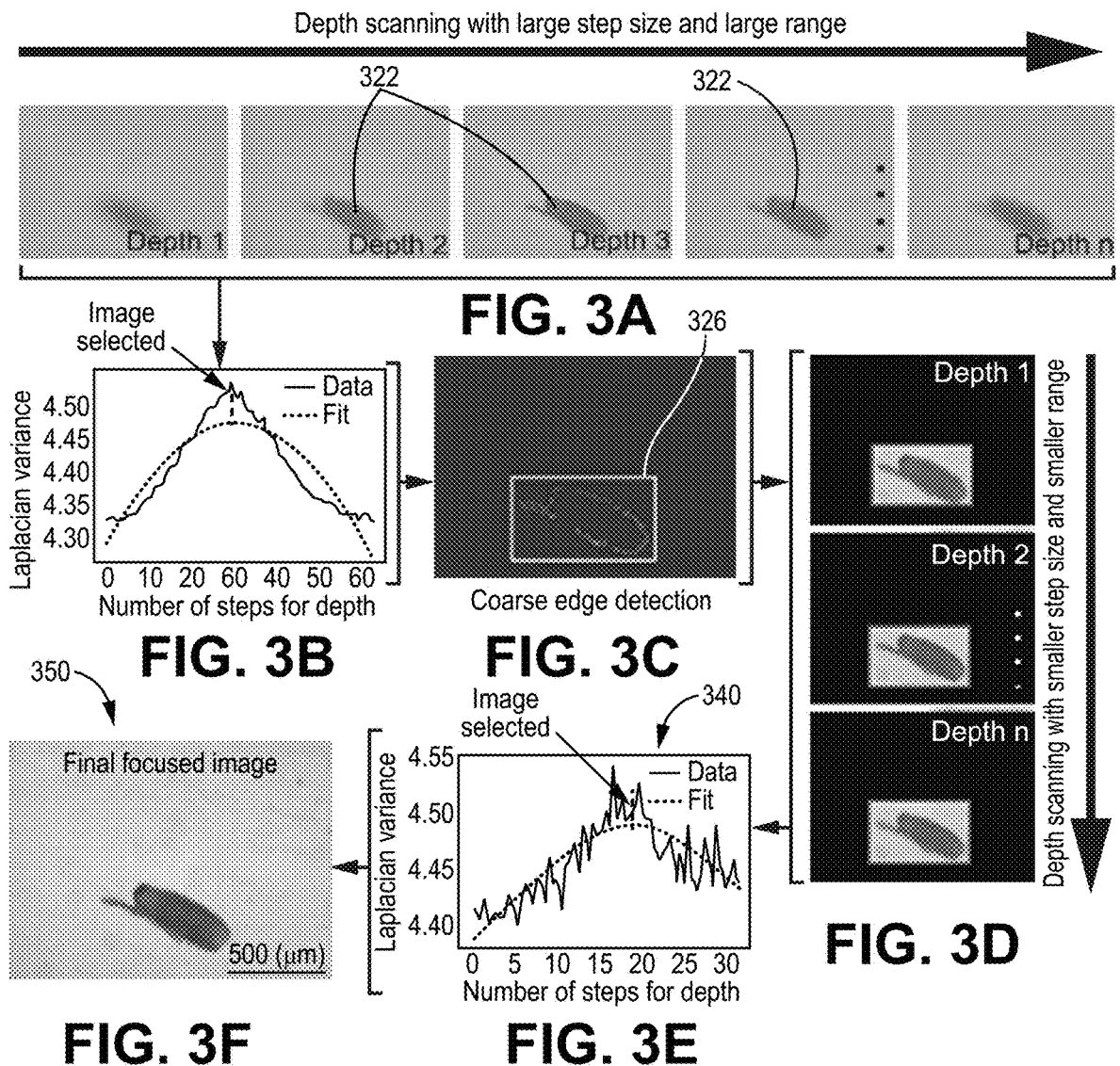

MULTI-PERSPECTIVE MICROSCOPIC IMAGING GUIDED MICROINJECTION OF MICROSCOPIC OBJECTS ACROSS LARGE FIELD OF VIEWS This application claims the benefit of U.S. Provisional Patent Application No. 63/200,721, filed 24 Mar. 2021, the entire contents of which is incorporated herein by reference.

GOVERNMENT RIGHTS

This invention was made with government support under R21OD028214, R24OD028444, R21NS112886, and R34NS111654 awarded by the National Institutes of Health. The government has certain rights in the invention.

TECHNICAL FIELD

The invention relates to equipment for microinjection of substances into microscopic objects.

BACKGROUND

Manual microinjection enables scientists to inject microscopic objects, such as cells, with molecules or other substances of interest for research purposes. Other methods of delivery of substances into microscopic objects include viral delivery and electroporation.

SUMMARY

This disclosure describes automated microinjection of substances, such as genetic material, into microscopic objects, such as embryos, tissues, and/or the like. For example, techniques are described that enable automating the process of injecting controlled solutions into embryos using a system that includes, but is not limited to, a pressure controller, a micropipette, and a computing system. The techniques may achieve increased yield with an increased total number of attempts in similar or less amount of time as compared to manual injection.

In one example, a system comprises: a pressure controller configured to cause a micropipette to eject a substance from a tip of the micropipette; a stereoscopic imaging apparatus configured to generate stereoscopic image data, wherein the stereoscopic image data comprises a stereoscopic image of the tip of the micropipette and a particular microscopic object of the plurality of microscopic objects; a first camera configured to generate first image data, wherein the first image data comprises a first image of the plurality of microscopic objects at a first magnification; a second camera configured to generate second image data, wherein the second image data comprises a second image of the particular microscopic object at a second magnification; and a computing system configured to: determine, based on the stereoscopic image of the tip of the micropipette, a location of the tip of the micropipette on the x-axis, the y-axis, and the z-axis; apply a machine-learned model to determine, based on the first image of the plurality of microscopic objects, a location of the particular microscopic object of the plurality of microscopic objects on the x-axis and the y-axis; adjust a depth of focus of the second camera to focus, based on the second image of the particular microscopic object, on the particular microscopic object, wherein the depth of focus corresponds to a distance between the second camera and the particular microscopic object when the second camera focuses on the particular microscopic object; determine, based on the depth of focus of the second camera, a location of the particular microscopic object on the z-axis; and control the pressure controller to cause the micropipette to eject the substance from the tip of the micropipette and into the particular microscopic object.

In one example, a method comprises: generating, by a stereoscopic imaging apparatus, stereoscopic image data, wherein the stereoscopic image data comprises a stereoscopic image of a tip of a micropipette and a particular microscopic object of the plurality of microscopic objects; generating, by a first camera, first image data, wherein the first image data comprises a first image of the plurality of microscopic objects at a first magnification; generating, by a second camera, second image data, wherein the second image data comprises a second image of the particular microscopic object of the plurality of microscopic objects at a second magnification; determining, by a computing system and based on the stereoscopic image of the tip of the micropipette, a location of the tip of the micropipette on the x-axis, the y-axis, and the z-axis; applying, by the computing system, a machine-learned model to determine, based on the first image of the plurality of microscopic objects, a location of the particular microscopic object of the plurality of microscopic objects on the x-axis and the y-axis; adjusting, by the computing system, a depth of focus of the second camera to focus, based on the second image of the particular microscopic object, on the particular microscopic object, wherein the depth of focus corresponds to a distance between the second camera and the particular microscopic object when the second camera focuses on the particular microscopic object; determining, by the computing system, based on the depth of focus of the second camera, a location of the particular microscopic object on the z-axis; and controlling, by the computing system, a pressure controller to inject a gas into the micropipette to eject the substance from the tip of the micropipette and into the particular microscopic object.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIGS. 3A-3F illustrates an example of an autofocus algorithm to determine a location of a microscopic object on a z-axis, in accordance with one or more techniques of this disclosure.

DETAILED DESCRIPTION

Manual microinjection enables scientists to inject single cells with molecules or other substances of interest in order to investigate cell decision making, cell differentiation, or other biological processes. However, manual microinjection typically requires extensive training and expertise. Furthermore, manual microinjection typically results in a low number of attempts per sample (e.g., 30-90 attempts per sample) and low yield (e.g., ~15%) for experienced users. Accordingly, the limitations of manual microinjection may restrict the scope of experiments and inhibit broad uptake of the microinjection technology across laboratories. Other methods of delivery of substances into microscopic objects include viral delivery and electroporation. Both methods affect large populations of cells but do not allow for single cell specificity. Additionally, both methods are only able to deliver one or two gene products at once with uncontrolled concentrations. Further, electroporation requires particles to be charged for successful delivery.

The current disclosure addresses this issue by describing systems and techniques that enable automated injection of controlled solutions into individual microscopic objects using, for example, a system that includes, but is not limited to, a pressure controller, a micropipette, and a computing system. The system may achieve increased yield with an increased total number of attempts in similar or less amount of time as compared to manual injection. The resulting high throughput may enable scientists to screen molecules and genes of interest in microscopic objects to better understand various biological processes. The system may also facilitate transgenesis, mutagenesis, and cryopreservation applications. In some examples, the system injects solution into zebrafish embryos, *Drosophila melanogaster*, black soldier flies, mosquito embryos, frog oocytes, and various other organisms.

Figure 1:
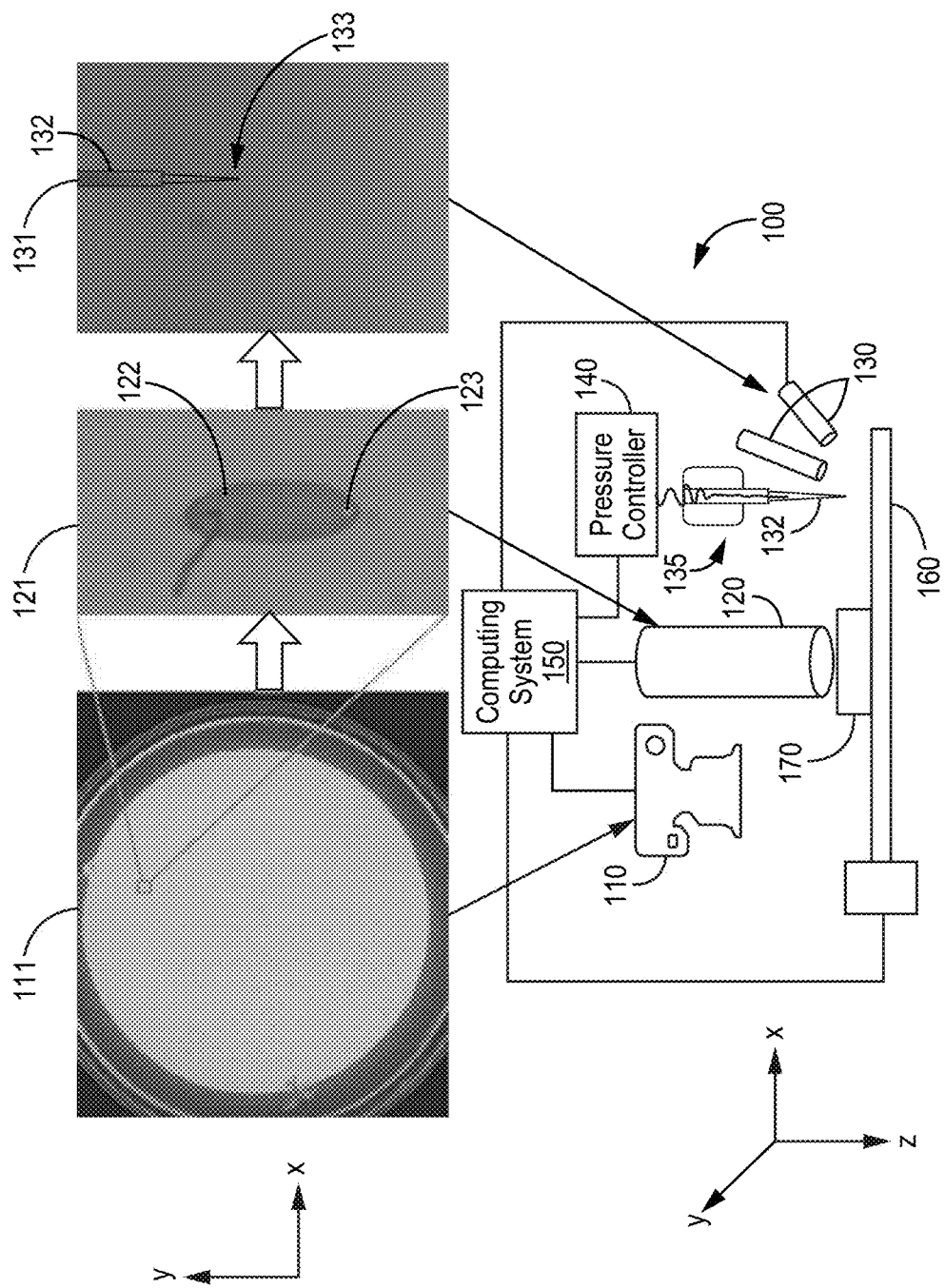
FIG. 1 is a conceptual diagram of an example system of an autoinjector configured to automate microinjection of substances into microscopic objects, in accordance with one or more aspects of this disclosure.

FIG. 1 is a conceptual diagram of an autoinjector 100 configured to automate microinjection of substances into microscopic objects, such as embryos, tissues (intact or not), and/or the like, in accordance with one or more aspects of this disclosure. Autoinjector 100 may be a system that is configured to utilize multi-perspective, multi-scale imaging, combined with machine learning and computer vision algorithms to detect a microscopic object of a plurality of microscopic objections in a container and guide the detected microscopic object in the container to a micropipette for microinjection.

As shown in FIG. 1, autoinjector 100 may include a pressure controller 140, a micropipette 132, a stereoscopic imaging apparatus 130, a first camera 110, a second camera 120, and a computing system 150. In some examples, autoinjector 100 may further include a stage 160 configured to support and move a container 170, such as a Petri dish, containing the plurality of microscopic objects. A circular light-emitting diode (LED) illuminator (not shown) within stage 160 may illuminate container 170 from the bottom.

Computing system 150 may include one or more computing devices 902, such as mobile or non-mobile computing devices. For example, computing devices 902 may include a personal computer, a laptop computer, a tablet computer, a smartphone, a server computer, or another type of computing device. In some examples, the computing device may be located remotely from the other components of the system. The computing device(s) may respectively include processors 904 that implement functionality and/or execute instructions associated with the computing device 904. Examples of processors 904 may include one or more of an application specific integrated circuit (ASIC), a field programmable gate array (FPGA), an application processor, a display controller, an auxiliary processor, a central processing unit (CPU), a graphics processing unit (GPU), one or more sensor hubs, and any other hardware configure to function as a processor, a processing unit, or a processing device.

Computing system 150 may interface with all the components of autoinjector 100, including pressure controller 140, stage 160, stereoscopic imaging apparatus 130, first camera 110, and second camera 120.

As an example, computing system 150 may be configured to control stage 160 to sequentially manipulate container 170 to various locations where the plurality of microscopic objects in container 170 may be imaged at multiple magnifications and perspectives by first camera 110, second camera 120, and/or stereoscopic imaging apparatus 130.

Computing system 150 may use images from first camera 110. First camera 110 may be configured to generate first image data that includes a first image 111 of a plurality of microscopic objects in container 170 at a first magnification. The first magnification may be such that all microscopic objects of interest are within the field of view of first camera 110. Computing system 150 may receive the first image data from first camera 110. In some examples, first camera 110 may be a digital camera, such as a digital single-lens reflex (DSLR) camera.

Computing system 150 may be configured to apply a machine-learned model ("ML model") to the first image data to determine locations of microscopic objects on an x-axis and a y-axis. In some examples, the ML model may represent one or more artificial neural networks (also referred to as neural networks). A neural network may include a group of connected nodes, which also may be referred to as neurons or perceptrons. A neural network may be organized into one or more layers. Neural networks that include multiple layers may be referred to as "deep" networks. A deep network may include an input layer, an output layer, and one or more hidden layers positioned between the input layer and the output layer. The nodes of the neural network may be fully connected or non-fully connected.

In some examples, the ML model may include a Region Proposal Network (RPN) that shares full-image convolutional features with a detection network. The RPN may be a fully convolutional network that simultaneously predicts object bounds and confidence scores at each position. The RPN may be trained end-to-end to generate high-quality region proposals. Faster regions based convolutional neural networks (Faster R-CNN) may use the generated high-quality region proposals for detection. RPN may be further merged with Faster R-CNN into a single network by sharing their convolutional features to form a Faster region based convolutional neural networks (Faster R-CNN). In some examples, the ML model may include a you-only-look-once (YOLO) CNN model. YOLO may achieve real-time speed by simultaneously predicting bounding box coordinates and class probabilities from an image. The Faster R-CNN and YOLO are examples of ML models that may be used in this disclosure.

In some examples, the ML model may represent one or more convolutional neural networks. In some instances, a convolutional neural network may include one or more convolutional layers that perform convolutions over input data (e.g., first image data) using learned filters. Filters may also be referred to as kernels. Convolutional neural networks may be useful for vision problems, such as determining the locations of microscopic objects. In other examples, the computing system may use other types of ML models to determine the locations of the microscopic objects.

In order to locate the microscopic objects, the ML model may be trained to perform classification on image data to identify portions of the image data (e.g., associated with pixels of the first image 111) as microscopic objects. The ML model may be trained using supervised learning techniques. For example, the ML model may be trained on a training dataset of image data that includes training examples labeled as belonging (or not belonging) to a class of microscopic objects to be injected. In some examples, the ML model may be trained by optimizing an objective function. The objective function may represent a loss function that compares (e.g., determines a difference between) output data generated by the model from the training data and labels (e.g., ground-truth labels) associated with the training data. For example, the loss function may evaluate a sum or mean of squared differences between the output data and the labels.

As described above, the ML model may perform classification to identify in the first image data microscopic objects to be injected. For example, the ML model may perform binary classification by generating output data that classifies portions of the first image data (e.g., a collection of pixels of the first image 111) as belonging to either a "microscopic object" class or "not a microscopic object" class. In some examples, the ML model may perform classification in which the ML model provides, for each of the classes, a numerical value descriptive of a degree of likelihood that the input data should be classified into the corresponding class. In some instances, the numerical values provided by the ML model may be referred to as "confidence scores" that are indicative of a respective confidence associated with classification of the input into the respective class.

In some examples, the confidence scores may be compared to one or more thresholds to render a discrete categorical prediction. For example, the ML model may provide a confidence score for a portion of the first image data representing a particular microscopic object. If the confidence score exceeds a threshold, the ML model may classify the portion of the first image data, and thus corresponding pixels of the first image, as a microscopic object. The corresponding pixels of the first image 111 may be associated with a location of a particular microscopic object 122. In this way, computing system 150 may use the ML model to determine the location on the x-axis and the y-axis of at least one particular microscopic object of the plurality of microscopic objects and subsequently define an area surrounding microscopic object 122.

As an example, the computing system 150 may be configured to control stage 160 to move container 170 so the defined area that includes microscopic object 122 may be imaged by the second camera 120.

Computing system 150 may use second image data generated by second camera 120 to obtain additional information about the location of microscopic object 122. Second camera 120 may be configured to take a plurality of images at multiple heights to generate the second image data. Computing system 150 may use an autofocus algorithm to analyze the second image data and determine second image 121 is the plane of best focus. An example of an autofocus algorithm is shown in FIG. 3 and discussed below. The second image data may be associated with a second image 121 of the particular microscopic object of the plurality of microscopic objects at a second magnification. The second magnification may be greater than the first magnification such that second camera 120 provides a higher-resolution image of microscopic object 122, allowing for more precise observation of microscopic object 122. For example, the first magnification may be 10×, and the second magnification may be 20×. In any case, computing system 150 may change a magnification level of first camera 110 and/or second camera 120 (e.g., in response to receiving an indication of user input selecting a magnification button). Second camera 120 may be a microscope camera. Second camera 120 may be positioned to have a pre-determined location on the x-axis, y-axis, and the z-axis.

As noted above, computing system 150 may use the first image data to determine the location of microscopic object 122 on the x-axis and the y-axis. To determine the location of microscopic object 122 on the z-axis, computing system 150 may be configured to automatically adjust (e.g., using a computer vision module, the ML model, etc.) a depth of focus of the second camera 120 to focus on microscopic object 122. The depth of focus may correspond to a distance between second camera 120 (with a pre-determined location on the x-axis, y-axis, and the z-axis) and microscopic object 122 (with a determined location on the x-axis and the y-axis). Accordingly, computing system 150 may determine (e.g., by, at least in part, using the Pythagorean theorem) the location of microscopic object 122 on the z-axis.

In some examples, computing system 150 may further determine an injection location 123 on microscopic object 122. For example, computing system 150 may be configured to detect (e.g., using a computer vision module, the ML model, etc.) one or more features (e.g., a first end, a second end, an appendage, a centroid of microscopic object 122, an anatomically significant part of microscopic object 122, etc.) of microscopic object 122 and determine corresponding locations of the one or more features on the x-axis, the y-axis, and the z-axis. Computing system 150 may then determine, based on the corresponding locations of the one or more features, an injection location 123 of microscopic object 122 on the x-axis, the y-axis, and the z-axis. In some examples, the computing system 150 determine may determine the one or more features on the x-axis, the y-axis, and the z-axis based on at least one of the stereoscopic image data, the first image data, and the second image data. In some examples, the computing system 150 determine may determine the one or more features on the x-axis, the y-axis, and the z-axis based on the stereoscopic image data and the second image data.

In some examples, computing system 150 may be configured to control stage 160 to move container 170 under micropipette 132. For instance, because stage 160 may include an LED that illuminates container 170, the LED may also illuminate 132 when container 170 is moved to be under micropipette 132.

Computing system 150 may be configured to interface with stereoscopic imaging apparatus 130 to determine the location of a tip of micropipette 132. Stereoscopic imaging apparatus 130 may be configured to generate stereoscopic image data associated with a stereoscopic image 131 of the tip 133 of micropipette 132 and, in some examples, one or more microscopic objects. The stereoscopic image 131 of the tip 133 of micropipette 132 may include a primary image of the tip of micropipette 132 from a first viewpoint and a secondary image of the tip of micropipette 132 from a second viewpoint. Thus, stereoscopic image 131 may contain information about the location of the tip 133 of micropipette 132 on the x-axis, the y-axis, and the z-axis, which computing system 150 may use in accordance with one or more techniques described herein.

As an example, stereoscopic imaging apparatus 130 may include at least one inclined microscope. A microscope may be considered inclined if the angle of image of the microscope is not transverse to an upper surface of container 170. As another example, stereoscopic imaging apparatus 130 may include at least two inclined microscopes. In an example, the at least two inclined microscopes may be configured to simultaneously image the tip 133 of micropipette 132 from at least two respective perspectives. Computing system 150 may be configured to use a tip detection algorithm to determine the location of the tip 133 of micropipette 132 in 3-D space. As an example, computing system 150 may be configured to apply a combination of a Canny edge detection algorithm, Gaussian blur algorithm, and Hough transform to the images of the at least two inclined microscopes to determine the location of the tip 133 of micropipette 132.

As an example, micropipette 132 may be prepared by first pulling glass aluminosilicate capillaries using a flaming/brown micropipette puller. Once pulled, a microelectrode beveller may bevel the micropipette to obtain tip 133 diameters between 5 µm to 10 µm.

Stereoscopic imaging apparatus 130 may also be configured to image microscopic object 122. Computing system 150 may be configured to determine an injection location 123 of microscopic object 122 for the tip 133 of the micropipette 132 using an injection point estimation algorithm analyzing the morphology of microscopic object 122. An example of an algorithm to determine an injection location 123 is shown in FIG. 4 and discussed below. Computing system 150 may be configured to determine a trajectory to guide injection location 123 of microscopic object 122 to contact the tip 133 of micropipette 132.

Upon determining the location of the tip 133 of micropipette 132 and the injection location 123 of microscopic object 122, computing system 150 may be configured to control stage 160 to move container 170 so microscopic object 122 is positioned underneath micropipette 132.

Computing system 150 may be configured to control one or more components of autoinjector 100 to cause the tip 133 of micropipette 132 to be embedded within microscopic object 122 (e.g., at injection location 123). For example, stage 160 supporting the container 170 of microscopic objects may be configured to move container 170 of microscopic objects along one or more of an x-axis, a y-axis, or a z-axis, in this way providing multi-axis motion to suitably position microscopic object 122. Additionally or alternatively, autoinjector 100 may include a robotic manipulator apparatus 135 configured to hold and move micropipette 132 along one or more of the x-axis, the y-axis, or the z-axis. In examples in which autoinjector 100 includes both stage 160 and robotic manipulator apparatus 135, computing system 150, based on the determined trajectory, may be configured to control stage 160 and/or robotic manipulator apparatus 135 to move container 170 and/or micropipette 132 such that the tip 133 of micropipette 132 is embedded within microscopic object 122 in accordance with one or more techniques of this disclosure.

Computing system 150 may be configured to control pressure controller 140 to cause micropipette 132 to eject a substance (e.g., genetic material) from the tip 133 of micropipette and into microscopic object 122. For example, pressure controller 140 may be configured to inject a gas into micropipette 132 to eject the substance from a tip 133 of micropipette 132. Pressure controller 140 may precisely deliver injection pressure to micropipette 132 during microinjection. For example, pressure controller 140 may downregulate incoming pressure (e.g., house pressure) to the desired pressure and deliver the pressure to micropipette 132. The injection pressure may be correlated with an amount (e.g., a volume) of the substance ejected from the tip 133 of micropipette 132 and, thus, injected into microscopic object 122. In some examples, the computing system 150 may be configured to receive an indication of user input specifying a pressure of the gas and control the pressure controller 140 to inject the gas at the specified pressure.

In some examples, robotic manipulator apparatus 135 may also be configured to hold and move a plurality of micropipettes during a microinjection procedure by autoinjector 100, as described above. The plurality of micropipettes may help multiple solutions to be injected in a single experiment. In some examples a multi-pipette system may switch between multiple pipettes filled with different solutions. Each pipette may be attached to pressure controller 140 to deliver solution.

In some examples, the same micropipette 132 may also be used to inject different solutions. In some examples, pressure controller 140 may be a force controller. As an example, the force controller may be used to inject different solutions by moving a small piston inside micropipette 132. The force controller may control a stepper motor to move a piston in micropipette 132 to eject solution from tip 133 of micropipette 132. The force controller may be calibrated such that a small piston moves a specific amount inside micropipette 132 to deliver a corresponding specific amount of solution. In some examples, this technique may be used to front fill micropipette 132 with any solution, by moving the small piston back and creating a vacuum inside micropipette 132. Once micropipette 132 is filled with one solution, the small piston may move forward for each microinjection to deliver a set amount of solution. Once microinjection of a first solution is finished, the force controller removes the remaining solution in micropipette 132 and then fills micropipette 132 with a second solution. The force controller may be used to deliver the second solution from micropipette 132 in a similar fashion as described above with regards to delivering the first solution.

Figure 2:
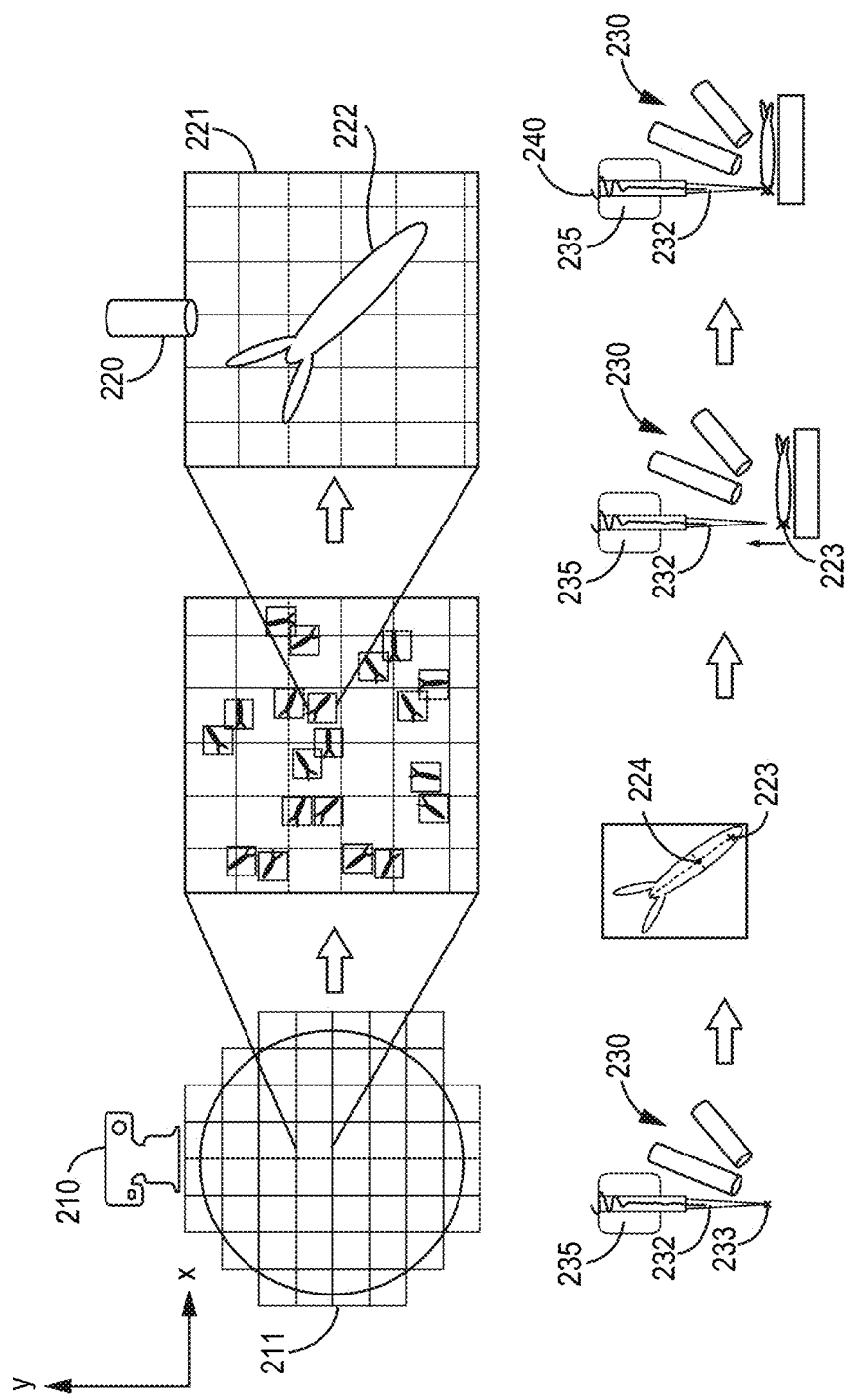
FIG. 2 is a conceptual diagram of an example procedure for microinjecting substances into microscopic objects, in accordance with one or more techniques of this disclosure.

FIG. 2 is a conceptual diagram of an example procedure for microinjecting substances into microscopic objects, in accordance with one or more techniques of this disclosure. As an example, a computing system, as shown in 150 (FIG. 1) and described above, may be used in the injection procedure shown in FIG. 2. As shown in FIG. 2, computing system 150 may use images from first camera 210. First camera 210 may generate first image data that includes a first image 211 of a plurality of microscopic objects at a first magnification. The first magnification may be such that all microscopic objects of interest are within the field of view of first camera 210.

Computing system 150 may divide the first image 211 into a plurality of sub-images. Computing system 150 may use the ML model to analyze each of the sub-images of the first image data to determine locations of microscopic objects on an x-axis and a y-axis. In some examples, the ML model may represent one or more artificial neural networks (also referred to as neural networks), such as one or more convolutional neural networks. The ML model may be trained such that the ML model is able to perform classification on the first image data to identify portions of the first image data (e.g., associated with pixels of the first image 211) as microscopic objects. The ML model may be trained using supervised learning techniques. For example, the ML model may be trained on a training dataset of image data that includes training examples labeled as belonging (or not belonging) to a class of microscopic objects to be injected.

The ML model may perform classification to identify microscopic objects to be injected in the first image data. For example, the ML model may perform binary classification by generating output data that classifies portions of the first image data (e.g., a collection of pixels of the first image) as belonging to either a "microscopic object" class or "not a microscopic object" class. In some examples, the ML model may perform classification in which the ML model provides, for each of the classes, a confidence score descriptive of a degree of likelihood that the input data should be classified into the corresponding class. In some examples, if the confidence score exceeds a threshold, the ML model may classify the portion of the first image data, and thus corresponding pixels of the first image 211, as a microscopic object 222. The corresponding pixels of the first image 211 may be associated with a location of the particular microscopic object on the x-axis and the y-axis. The ML model may subsequently define an area surrounding the detected microscopic object 222. The ML model may include a Region Proposal Network (RPN) that shares full-image convolutional features with a detection network. The RPN may be a fully convolutional network that simultaneously predicts object bounds and confidence scores at each position. The RPN may be trained end-to-end to generate high-quality region proposals. Faster regions based convolutional neural networks (Faster R-CNN) may use the generated high-quality region proposals for detection. The RPN may be further merged with a Faster R-CNN into a single network by sharing their convolutional features. In some examples, the ML model may include a YOLO CNN model. The Faster R-CNN and YOLO are examples of ML models that may be used in this disclosure.

Computing system 150 may move stage 160 to move container 170 so the second camera 220 may image the defined area surrounding the detected microscopic object 222 at multiple heights to compile a stack of images.

Computing system 150 may use second image data generated by the second camera 220 of autoinjector 100 to obtain additional information about the location of the particular microscopic object. The second image data may be associated with a second image 221 of the particular microscopic object 222 of the plurality of microscopic objects at a second magnification. The second magnification may be greater than the first magnification such that second camera 220 provides a higher-resolution image of microscopic object 222, allowing for more precise observation of microscopic object 222. In some examples, computing system 150 may change a magnification level of first camera 210 and/or second camera 220 (e.g., in response to receiving an indication of user input selecting a magnification button). Second camera 220 may be positioned to have a pre-determined location on the x-axis, y-axis, and the z-axis.

To determine the location of microscopic object 222 on the z-axis, computing system 150 may automatically adjust (e.g., using a computer vision module, the ML model, etc.) a depth of focus of second camera 220 to focus on microscopic object 222. The depth of focus may correspond to a distance between second camera 220 (with a pre-determined location on the x-axis, y-axis, and the z-axis) and microscopic object 222 (with a determined location on the x-axis and the y-axis). Accordingly, computing system 150 may determine the location of microscopic object 222 on the z-axis. An example of an autofocus algorithm computing system 150 may be configured to use to determine a location of microscopic object 222 on the z-axis is discussed below with respect to FIGS. 3A-3F.

Computing system 150 may move stage 160 to move container 170 under micropipette 232 to illuminate micropipette 232 so the stereoscopic imaging apparatus 230 may image micropipette 232 to determine location of micropipette 232.

Computing system 150 may be configured to interface with stereoscopic imaging apparatus 230 to determine the location of a tip 233 of micropipette 232. Stereoscopic imaging apparatus 230 may generate stereoscopic image data associated with a stereoscopic image of the tip 233 of micropipette 232. The stereoscopic image of the tip 233 of micropipette 232 may include a primary image of the tip of micropipette 232 from a first viewpoint and a secondary image of the tip of micropipette 232 from a second viewpoint. Thus, the stereoscopic image may contain information about the location of the tip 233 of micropipette 232 on the x-axis, the y-axis, and the z-axis, which computing system 150 may use in accordance with one or more techniques described herein. Thus, computing system 150 may determine (e.g., by applying one or more computer vision algorithms), based on the stereoscopic image of the tip 233 of micropipette 232, a location of the tip 233 of micropipette 232 on the x-axis, y-axis and z-axis. As discussed above, computing system 150 may be configured to apply a combination of a Canny edge detection algorithm, Gaussian blur algorithm, and Hough transform or ML models such as Faster R-CNN and YOLO to the images of the generated stereoscopic image data to determine the location of the tip 233 of micropipette 232.

In some examples, micropipette 232 may be prepared by first pulling glass aluminosilicate capillaries using a flaming/brown micropipette puller. Once pulled, a microelectrode beveller may bevel the micropipette to obtain tip 233 diameters between 5 μm to 10 μm.

Computing system 150 may then move stage 160 to move container 170 so microscopic object 222 is positioned approximately under tip 233 of micropipette 232.

Computing system 150 may be configured to interface with stereoscopic imaging apparatus 230 to determine an injection location 223 on microscopic object 222. Stereoscopic imaging apparatus 230 may generate stereoscopic image data associated with a stereoscopic image of microscopic object 222. In some examples, computing system 150 may further determine an injection location 223 on microscopic object 222. For example, computing system 150 may detect (e.g., using a computer vision module, the ML model, etc.) one or more features (e.g., a first end, a second end, an appendage, a centroid 224, etc.) of microscopic object 222 and determine corresponding locations of the one or more features on the x-axis, the y-axis, and the z-axis. Computing system 150 may then determine, based on the corresponding locations of the one or more features, an injection location 223 of microscopic object 222 on the x-axis, the y-axis, and the z-axis. In other words, computing system 150 may detect (e.g., by applying one or more computer vision algorithms)

one or more features of microscopic object 222. Additionally, computing system 150 may determine (e.g., by applying one or more computer vision algorithms) corresponding locations of the one or more features on the x-axis, the y-axis, and the z-axis. Computing system 150 may determine (e.g., by applying one or more computer vision algorithms) and based on the corresponding locations of the one or more features, an injection location 223 of the particular microscopic object 222 on the x-axis, the y-axis, and the z-axis. An example of an injection point estimation algorithm computing system 150 may be configured to use to determine injection location 223 of microscopic object 222 is discussed below with respect to FIGS. 4A-4D.

Computing system 150 may control one or more components of autoinjector 100 to determine a trajectory and cause the tip 233 of micropipette 232 to be embedded within microscopic object 222 (e.g., at the injection location 223). For example, the stage supporting the container of microscopic objects that moves the container of microscopic objects along one or more of an x-axis, a y-axis, or a z-axis, in this way providing multi-axis motion to suitably position microscopic object 222. Additionally or alternatively, autoinjector 100 may include a robotic manipulator apparatus 135 that holds and moves a micropipette 232 along one or more of the x-axis, the y-axis, or the z-axis. In examples in which autoinjector 100 includes both stage 160 and robotic manipulator apparatus 135, computing system 150 may control stage 160 and/or robotic manipulator apparatus 135 to move container 170 and/or micropipette 232 such that the tip 233 of micropipette 232 is embedded within microscopic object 222.

Responsive to the tip 233 of micropipette 232 being embedded within microscopic object 222, computing system 150 may control pressure controller 240 to cause micropipette 232 to eject a substance (e.g., genetic material) from the tip 233 of micropipette 232 and into microscopic object 222. Pressure controller 240 may inject a gas into micropipette 232 to eject the substance from a tip 233 of micropipette 232. Pressure controller 240 may precisely deliver injection pressure to micropipette 232 during microinjection. For example, pressure controller 240 may downregulate incoming pressure (e.g., house pressure) to the desired pressure and deliver the pressure to micropipette 232. The injection pressure may be correlated with an amount (e.g., a volume) of the substance ejected from the tip 233 of micropipette 232 and, thus, injected into microscopic object 222. In some examples, computing system 150 may receive an indication of user input specifying a pressure of the gas and control pressure controller 240 to inject the gas at the specified pressure.

In some examples, a plurality of micropipettes may be used during a microinjection procedure, as described above.

As discussed above, computing system 150 may be configured to use a ML model to the first image data to determine locations of a particular microscopic object 322 on an x-axis and a y-axis. FIGS. 3A-3F show an example of an autofocus algorithm computing system 150 may be configured to use to determine a location of a microscopic object 322 on a z-axis. In FIG. 3A, second camera 120 (FIG. 1) is configured to capture a plurality of images of the microscopic object at multiple locations on the z-axis (i.e. Depth 1, Depth 2, Depth 3, . . . Depth n). Computing system may analyze the captured plurality of images and determine a variance value using a Laplacian matrix.

As shown in FIG. 3B, for each image, computing system 150 may determine a variance value using a Laplacian matrix. Since the sharpness of an image is directly proportional to the variance, computing system 150 may select images with the highest variance. Each "step refer to a distance along the z-axis. The number of steps for depth refers to a location of microscopic object on the z-axis. The "data" line refers to specific Laplacian variance for each step of depth, while the "fit" line refers to a line that best expresses the relation between the obtained variances. Computing system 150 may use linear regression to determine "fit".

As shown in FIG. 3C, to further refine an estimated z-location, computing system 150 may be configured to use a preliminary edge detection algorithm to identify a region of interest 326 within each of the plurality of images captured by second camera 130. The region of interest 326 may correspond to where sharp transitions in contrasts occur.

As shown in FIGS. 3D and 3E, computing system 150 may be configured to determine Laplacian variance 340 within the region of interest 326 in the plurality of captured images. The number of steps for depth refers to the depth "n" and refers to a location of microscopic object on the z-axis. As shown in FIGS. 3B and 3E, the size of the steps in FIG. 3E is smaller than the size of the steps in FIG. 3B. The "data" line refers to specific Laplacian variance for each step of depth, while the "fit" line refers to a line that best expresses the relation between the obtained variances. Computing system may use linear regression to determine "fit". As shown in FIG. 3F, computing system 150 may select the captured image 350 with the highest Laplacian variance within the region of interest 326 as the best plane of focus.

As discussed above, stage 160 may be configured to move container 170, so a particular microscopic object is positioned at least substantially underneath micropipette 132 to determine an injection location of the particular microscopic object. Computing system 150 may be configured to analyze the images of the particular microscopic object captured by stereoscopic imaging apparatus 130 using an injection point estimation algorithm to determine the injection location.

Figure 4A:
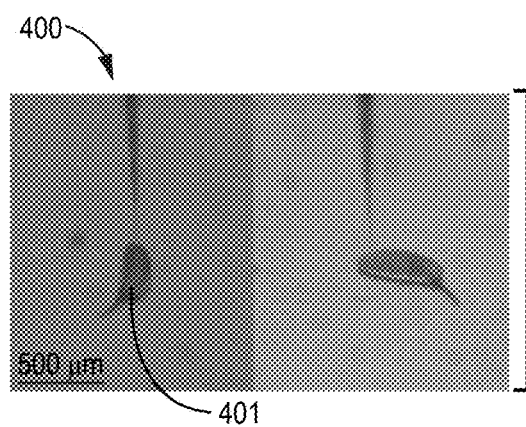
FIGS. 4A-4D illustrates an example of an injection point estimation algorithm to determine an injection location of a microscopic object.
Figure 4B:
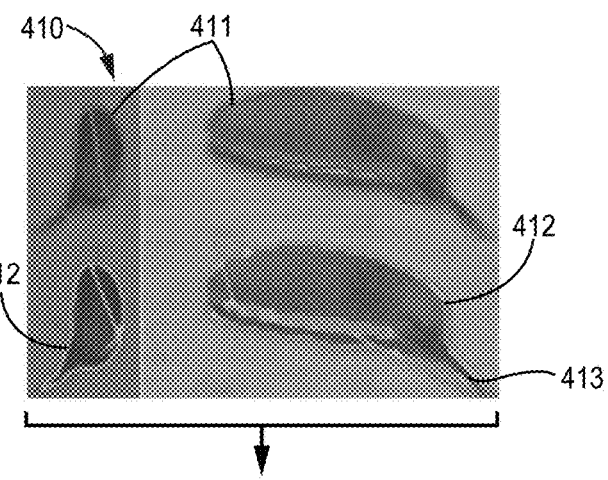

FIGS. 4A-4D illustrate a conceptual diagram of an example of an injection point estimation algorithm computing system 150 may be configured to use to determine an injection location of a particular microscopic object 401. Frame 400 of FIG. 4A shows images captured by stereoscopic imaging apparatus 130. In frame 410 of FIG. 4B, computing system 150 may apply an edge detection algorithm with a constant heuristically determined threshold to each image to define an edge 411 encompassing the main body of microscopic object 401. Utilizing a lower threshold in the same algorithm to define an edge 412 encompassing microscopic object 401, including dorsal appendages 413. As shown in FIG. 4B, computing system 150 may obtain contours from the edge detection algorithm of the body of microscopic object 401. Computing system 150 may rotate the images of the entire microscopic object 401 such that the images are aligned on an axis longitudinally, as shown in frame 420 of FIG. 4C. Computing system 150 may then determine the location of the posterior 421 of microscopic object 401, which is opposite to the side with dorsal appendages 422 using an object recognition ML model such as Faster R-CNN and YOLO.

Figure 4D:
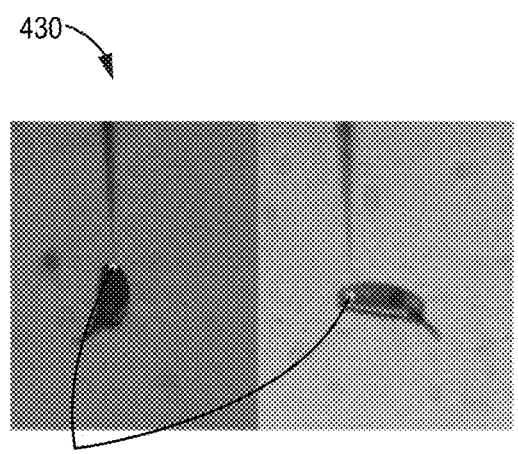
Figure 4C:
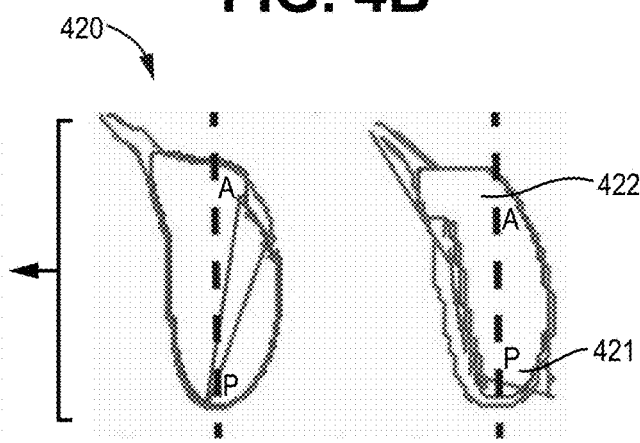

As an example, as shown in FIG. 4D, once the posterior location 421 of microscopic object 401 is determined in both perspectives, computing system 150 may determine an injection point 433. Microscopic object 401 is vertically aligned in one perspective (400, left), as compared to a horizontal alignment in the second perspective (400, right). As shown in FIG. 4D, at the posterior location in the more horizontally aligned perspective (430, right), computing system 150 may determine the x-coordinate for injection point 433 by multiplying the maximum x coordinate of the contours by a percentage. An example percentage may be 80%. At the posterior location in the more vertically aligned perspective, computing system 150 may determine the y-coordinate for injection point 433 by multiplying the maximum y-coordinate of the contours by a percentage. An example percentage may be 80%. Computing system 150 may determine the z-coordinate for the injection point 433 of microscopic object 401 by determining the y-coordinate of the contours at the surface of the particular microscopic object 401 for the more horizontally aligned microscopic object 401.

Figure 5:
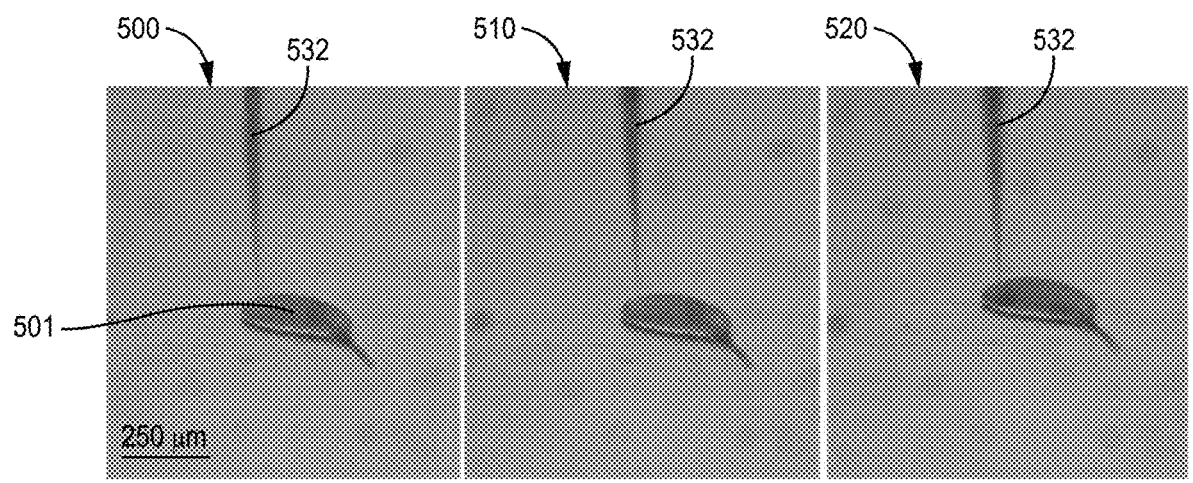
FIG. 5 illustrates an example of a micropipette being injected into a particular microscopic object and delivering a solution.

FIG. 5 is a conceptual diagram of an example of a micropipette 532 being injected into a particular microscopic object 501 and delivering solution. In frame 500, the micropipette 532 tip is located at the injection point of microscopic object 501. In frame 510, the micropipette 532 tip is located inside microscopic object 501. In frame 520, micropipette 532 is delivering solution to microscopic object 501.

Figure 6:
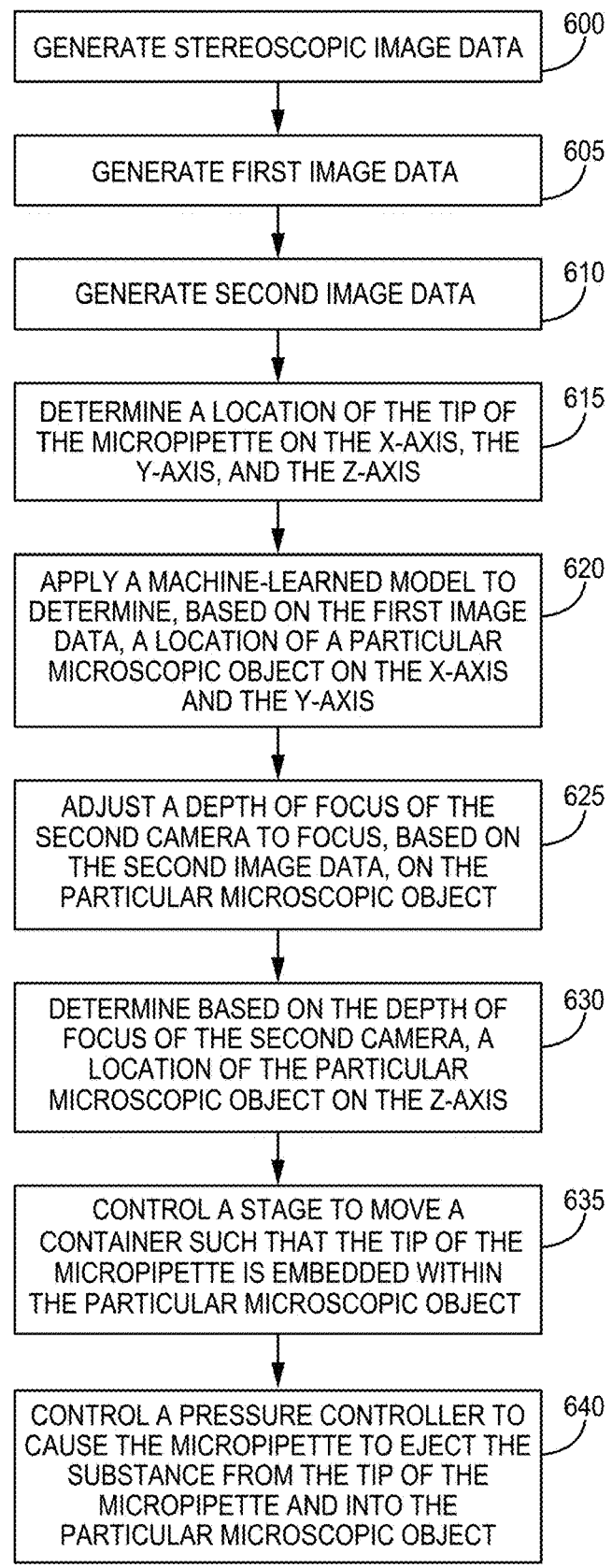
FIG. 6 is a flowchart illustrating an example operation of an autoinjector in accordance with a technique of this disclosure.

FIG. 6 is a flowchart illustrating an example operation of autoinjector 100, in accordance with one or more techniques of this disclosure. In the example of FIG. 6, computing system 150 (FIG. 1) of autoinjector 100 may control a stereoscopic imaging apparatus 130 to generate stereoscopic image data (600). The stereoscopic image data may comprise a stereoscopic image of a tip 133 of a micropipette 132 and a particular microscopic object 122 of the plurality of microscopic objects. Computing system 150 may comprise one or more computing devices.

Additionally, computing system 150 may control a first camera 110 to generate first image data (605). The first image data may comprise a first image of the plurality of microscopic objects at a first magnification. Additionally, computing system 150 may control a second camera 120 to generate second image data (610). The second image data may comprise a second image of the plurality of microscopic objects at a second magnification.

Additionally, computing system 150 may determine a location of the tip 133 of micropipette 132 on the x-axis, the y-axis, and the z-axis (615). As an example, the location of the tip 133 of micropipette 132 on the x-axis, the y-axis, and the z-axis may be based on the stereoscopic image of the tip 133 of micropipette 132.

Computing system 150 may apply a machine-learned model to determine a location of microscopic object 122 of the plurality of microscopic objects on the x-axis and the y-axis (620). A Faster R-CNN, as discussed above, may be an example of a ML model to detect different classes of microscopic objects, such as single embryos, clumps of embryos, dead embryos, and bubbles for embryos. Each object detected may be assigned a surrounding area (i.e., bounding box), a class, and a prediction score. In some examples, over a thousand images of each class may be annotated to train ML model. These images may also be augmented via blurring and rotation. Clumps of embryos, dead embryos, and bubbles may be included so as to not have them detected as single embryos. Once training is complete, object detections made by ML model may be analyzed to evaluate performance of ML model.

In some examples, computing system 150 may determine the location of microscopic object 122 on the x-axis and the y-axis based on the first image of the plurality of microscopic objects.

Additionally, computing system 150 may compute transformation matrices to translate a point in the field of view (FOV) of first camera 110 to the FOV of second camera 120. As an example, a plurality of fiduciary markers may be placed on container 170 and computing system 150 may determine a centroid of the markers in pixel coordinates of the first image. Computing system 150 may move stage 160 so the determined centroid is coincident with a center of FOV of the second camera 120. Computing system 150 may record a distance moved in the x-direction and the y-direction and repeat this process for each of the fiduciary markers to compute a transformation matrix. Computing system 150 may further calculate an offset by detecting a centroid of microscopic object 122 with the second camera 120. Computing system 150 may move the location of the detected centroid to the center of the FOV of the second camera 120 by a specific amount in the x-direction and the y-direction. In some examples, computing system 150 may then apply this offset to every x and y location computed by the transformation matrix for every microscopic object 122 detected on the container 170.

Additionally, computing system 150 may adjust a depth of focus of the second camera 120 to focus on microscopic object 122 (625). As an example, the depth of focus may be adjusted based on the second image of microscopic object 122. As an example, the depth of focus may correspond to a distance between second camera 120 and microscopic object 122 when second camera 120 focuses on microscopic object 122.

Additionally, computing system 150 may determine a location of microscopic object 122 on the z-axis (630). As an example, the location of microscopic object 122 on the z-axis may be determined based on the depth of focus of the second camera 120.

Additionally, computing system 150 may control a stage 160 to move a container 170 such that the tip 133 of micropipette 132 is embedded within microscopic object 122. As an example, computing system 150 may control the stage based on the location of the tip 133 of micropipette 132 and the location of microscopic object 122 (635).

Additionally, computing system 150 may control a pressure controller 140 to cause micropipette 132 to eject the substance from the tip 133 of micropipette 132 and into microscopic object 122 (640). For example, computing system 150 may control pressure controller 140 to inject a gas into micropipette 132 to eject the substance from a tip 133 of micropipette 132. Pressure controller 140 may precisely deliver injection pressure to micropipette 132 during microinjection. For example, pressure controller 140 may downregulate incoming pressure (e.g., house pressure) to the desired pressure and deliver the pressure to micropipette 132. The injection pressure may be correlated with an amount (e.g., a volume) of the substance ejected from the tip 133 of micropipette 132 and, thus, injected into microscopic object 122. In some examples, computing system 150 may be configured to receive an indication of user input specifying a pressure of the gas and control pressure controller 140 to inject the gas at the specified pressure.

Figure 7:
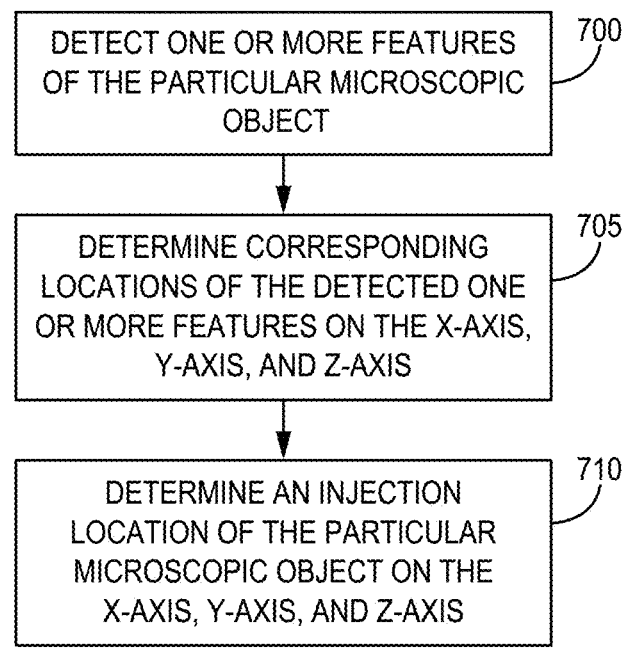
FIG. 7 is a flowchart illustrating an example operation of a computing system to determine an injection location in accordance with a technique of this disclosure.

FIG. 7 is a flowchart illustrating an example operation of computing system 150 of autoinjector 100 to determine an injection location of microscopic object 122 on the x-axis, the y-axis, and the z-axis.

In an example, the computing system 150 of autoinjector 100 may detect one or more features of microscopic object 122 (700). In some examples, computing system 150 may use a ML model, such as Faster R-CNN, to detect the one or more features.

Additionally, computing system 150 may determine corresponding locations of the detected one or more features on the x-axis, the y-axis, and the z-axis (705). The computing system 150 may determine the corresponding locations of the detected one or more features on the x-axis, the y-axis, and the z-axis based on the stereoscopic image data and the second image data. In some examples, computing system 150 may use transformation matrices and an autofocus algorithm, as discussed above, to determine the corresponding locations on the x-axis, the y-axis, and the z-axis.

Moreover, computing system 150 may determine an injection location 123 of microscopic object 122 on the x-axis, the y-axis, and the z-axis (710). As an example, computing system 150 may determine injection location 123 based on the determined corresponding locations of the one or more features of microscopic object 122.

Various experiments were performed to test the utility of autoinjector 100 configured to automate microinjection of substances into microscopic objects, such as embryos, tissues (intact or not), and/or the like, in accordance with one or more aspects of this disclosure.

The performance of an ML algorithm was evaluated by manually inspecting each object detected. With regards to *Drosophila melanogaster*, these include single isolated embryos, embryos that were clustered together into clumps, bubbles in the Petri dish agar substrate and other debris that have features and size similar to the embryos. Of note, *Drosophila melanogaster* embryos are approximately 500 μm long and approximately 100 μm wide. In comparison, zebrafish embryos are circular in shape, with a diameter of approximately 700 μm and an inner yolk of approximately 500 μm. The zebrafish embryos that are dead and not viable for microinjection may have darker features. This may be used to train the ML algorithm to detect dead embryos and ignore the dead embryos in further operations with the autoinjector 100.

In an experimental example, the ML algorithm took 67 seconds to analyze the image 111 taken by the first camera 110. The detections made by the ML algorithm for 17 containers 170 (5 containers containing *Drosophila melanogaster* embryos, and 12 containers containing zebrafish embryos) were then manually inspected. On average, each dish containing *Drosophila melanogaster* embryos had 45 embryos that were single and isolated, whereas 2 sets of embryos were clustered together into clumps. Only single isolated *Drosophila melanogaster* embryos were analyzed further by the autoinjector 100 and targeted for microinjection. The ML algorithm was able to detect single isolated embryos with an accuracy of 91% (n=223). Similarly, of the dishes analyzed, the average number of zebrafish embryos that were single on a container were 61, whereas an average of four embryos were dead embryos and the ML algorithm was able to detect single embryos with an accuracy of 94% (n=775).

In an experimental example, the accuracy of an autofocus algorithm was determined by visually observing if an embryo was in focus in the vertical microscope field of view. In the example, the autofocus algorithm took 23 seconds to analyze each image stack. The algorithm was successful 75% of the time (n=16 stacks analyzed) for *Drosophila melanogaster*, whereas the success rate of the algorithm was 100% when trying to focus zebrafish embryos (n=12 stacks analyzed). It is possible the clearer contrasting features of the zebrafish embryos led to the same autofocus algorithm operating with higher accuracy. Of note, the approximate value of the Z axis location was still acceptable to perform microinjection for *Drosophila melanogaster* embryos when the image was not in focus 25% of the time.

In an experimental example, the accuracy of the injection point estimation algorithm was determined by visually observing if the micropipette 132 tip 133 successfully penetrated the embryo at the desired injection location 123. Of the trials analyzed, the autoinjector 100 was able to successfully microinject 67% (n=89) of the *Drosophila melanogaster* embryos at the desired injection point, whereas the autoinjector 100 was successful 88% (n=739) of the time when attempting to microinject zebrafish embryos. Further, in 10% of the trials, the micropipette 132 successfully penetrated the outer membrane of the zebrafish embryo at the desired location, but failed to penetrate into the yolk. In the example, microinjection into each embryo took approximately 21 seconds.

In an experimental example, to calculate the overall accuracy of the autoinjector 100, the accuracies of the ML algorithm and injection point estimation algorithm, were considered. In the example, the autofocus algorithm was only used once per experiment and the approximate Z axis location determined for the dish is acceptable for microinjection, it was found that the autofocus algorithm accuracy did not affect the overall accuracy of the autoinjector 100. Thus, the overall accuracy of the autoinjector 100 was found to be 61% when attempting to microinject *Drosophila melanogaster* embryos and 83% when attempting to microinject zebrafish embryos. Based on results shown in Table 1 below, it was estimated that the autoinjector 100 may perform 166 microinjections per hour. When comparing the autoinjector's microinjection speed to that of a manual operator, the autoinjector 100 injects nearly 1.5-3 times as a fast than that of a manual operator (50-100 microinjections).

TABLE 1

Autoinjector speed

| Process | Time (sec) | Repeated |
|---|---|---|
| Machine learning | 67 | No |
| First camera to second camera | 2 | No |
| Autofocus | 23 | No |
| Micropipette tip detection | 20 | No |
| Microinjection | 21 | Yes |

In an experimental example, it was next evaluated whether the *Drosophila melanogaster* embryos microinjected by autoinjector 100 survived the procedures. After targeted microinjection of embryos on container 170, the containers were incubated at 66° F. for three days to allow development from embryo to larva. Development into a larva after three days was categorized as a successful survival, which was found to be 26% (n=97), as compared to 88% (n=16) of embryos in the same dish that were not injected. The survival rate achieved with the autoinjector 100 was comparable to manual microinjection (approximately 30%).

In an experimental example, Zebrafish embryos were incubated at 68° F. for five days post injection. Of the zebrafish embryos automatically microinjected by the autoinjector 100 63% (n=775) developed into larvae as compared to 95% of embryos in the same dish that were not injected (n=99). This is comparable to the survival rates in manual microinjection experiments (approximately 65%).

In a preliminary experimental example, it was tested if the autoinjector 100 may be used for transgenesis in zebrafish embryo. A plasmid (a loop of purified DNA), which encodes enhanced green fluorescent protein (EGFP), was injected into 1-4 cell stage embryos. GFP expression was observed both 24 hours and 5 days post injection. These preliminary results indicate that autoinjector 100 may facilitate transgenesis.

In an experimental example, survival rate and integration efficiency were calculated for PiggyBac transgenesis and PhiC31 integrase-mediated transgenesis. Survival rate was defined as the number of larvae/number of microinjected embryos, while integration efficiency was calculated as the number of vials with transgenic flies/number of fertile crosses. The overall survival rate (n=529) was 41% and the integration efficiency was 9%. Similarly, the overall survival rate (n=380) was 35% and the overall integration efficiency was 23% for PhiC31 integrase-mediated transgenesis. Lastly, in the experimental example, preliminary CRISPR/Cas9 microinjection experiments were performed and successful mutations were obtained where the nos-Cas9 transgene mutated the eye color of the fly and is displayed in the thorax of the fly via GFP. The overall survival rate (n=434) was 22% and the overall mutation rate was 38%.

Experiments were run for three conditions for the depth parameter sweep: 10 μm, 20 μm, and 30 μm. The results show the survival rate at 10 μm, was approximately 58%, the survival rate at 20 μm was approximately 30%, and the survival rate at 30 μm was approximately 25%. Thus, there appears to be a relationship between microinjection depth and survival rate where the survival rate is inversely correlated with the depth at which the microinjections are performed.

Experiments to test the effect of microinjection speed on survival rate were performed for three conditions: 1000 μm/s, 2000 μm/s, and 3000 μm/s. The results show the survival rate at 1000 μm/s was approximately 58%, the survival rate at 2000 μm/s was approximately 32%, and the survival rate at 3000 μm/s was approximately 20%. The results appear to show that microinjection speed is inversely correlated with survival rate.

Figure 8:
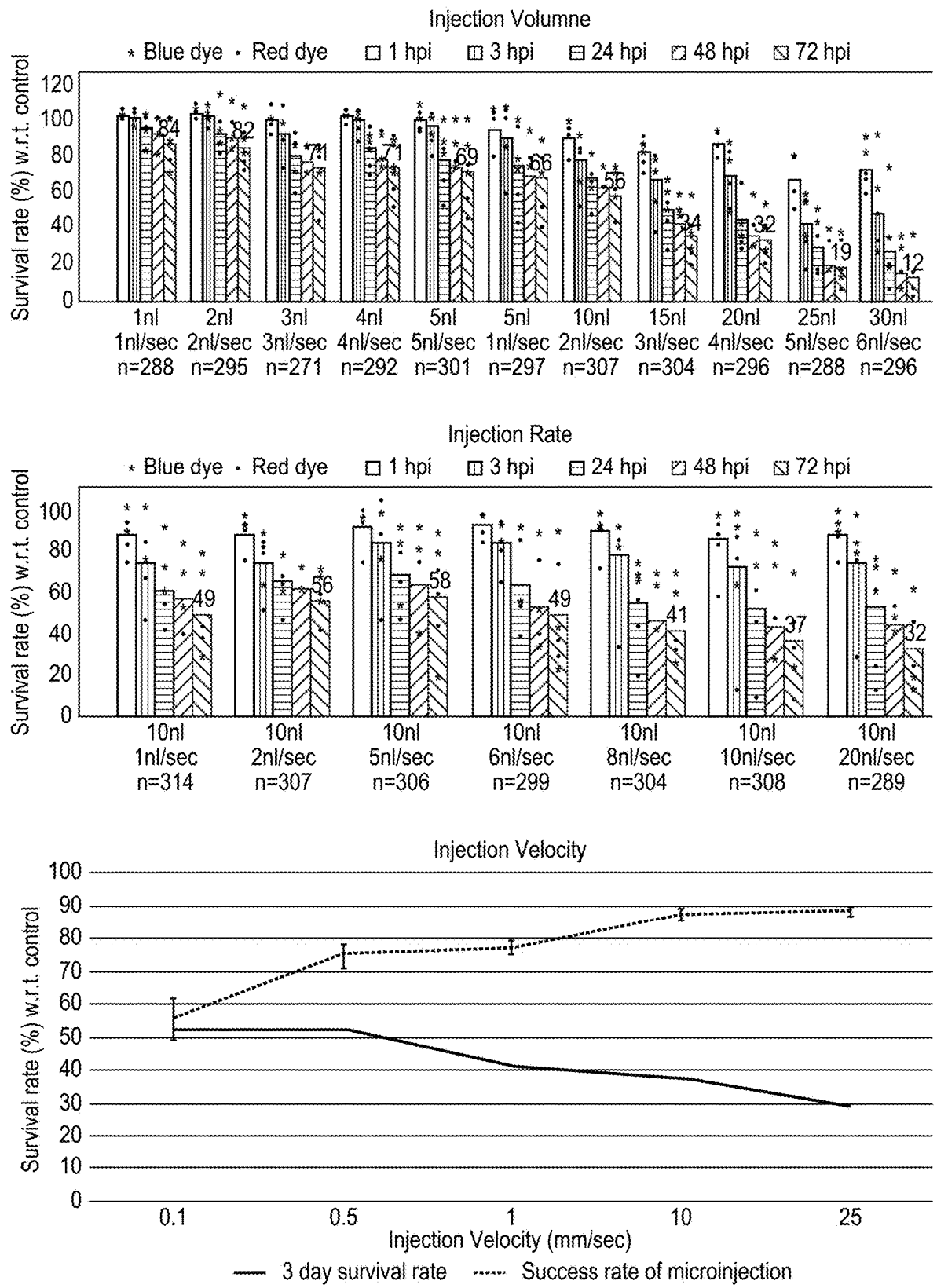
FIG. 8 illustrates survivability rates for zebrafish embryos for various injection parameters in an experimental example.

FIG. 8 shows survivability rates for zebrafish embryos for various injection parameters in an experimental example. Autoinjector 100 was used to microinject 14796 zebrafish embryos for various transgenesis and survivability studies. During survivability studies, various autoinjector 100 parameters such as volume of solution, rate of solution delivery, the velocity of micropipette penetration were varied to find the best-optimized parameters for the microinjection of zebrafish embryos. FIG. 8 shows the various survivability rates for the zebrafish embryos for different injection volumes, rates, and velocities. Embryo media was injected for all the survivability studies as a control isotonic solution. As injection volume increases the survivability of zebrafish embryos decreases. As the rate of injection increases, there is a point in the middle that rates as the highest survivability of zebrafish embryos. Also, the experiment shown in FIG. 8 shows that as the velocity of micropipette penetration increases the survivability of zebrafish embryos decreases.

In an experimental example with autoinjector 100, green fluorescent protein (GFP) and red fluorescent protein (RFP) were injected into zebrafish embryos using the same micropipette. Successful transgenesis was observed after 5 days. There was 0% cross-contamination between GFP and RFP injection. This appears to show that an autoinjector 100 may deliver two different solutions using the same micropipette with limited or no solution contamination.

Figure 9:
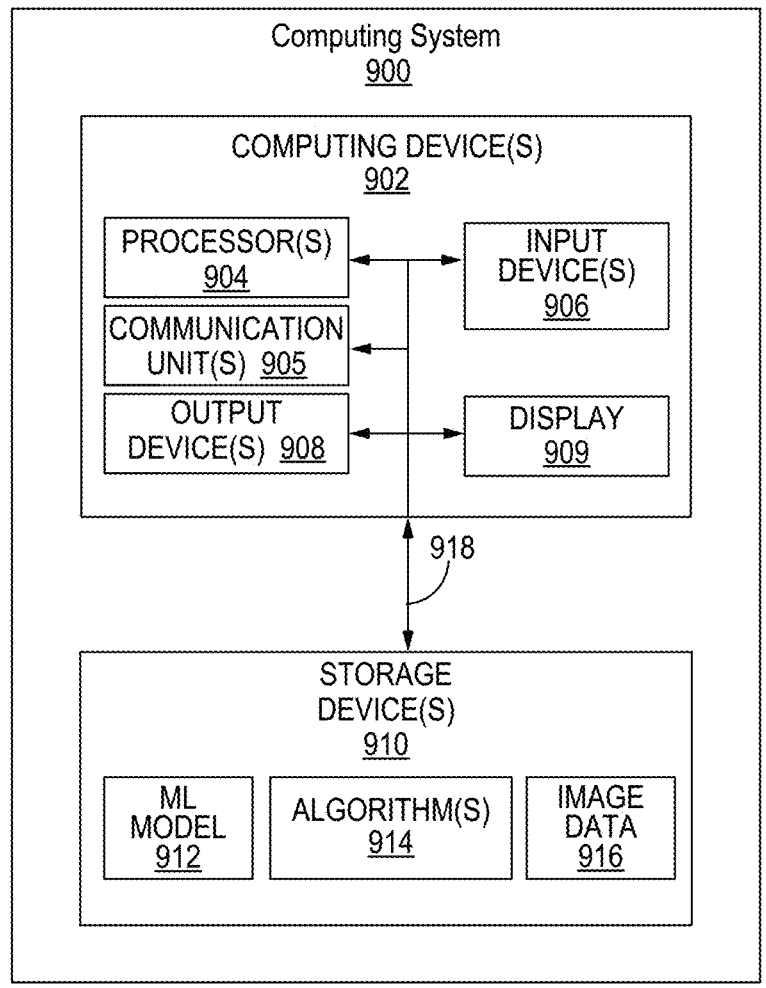
FIG. 9 is a block diagram illustrating example components of a computing system, in accordance with one or more aspects of this disclosure.

FIG. 9 is a block diagram illustrating example components of a computing system 900, in accordance with one or more aspects of this disclosure. FIG. 9 illustrates only one particular example of computing system 900, and many other example configurations of computing system 900 exist. For instance, computing system 900 may include one or more computing devices 902 and one or more storage devices 910.

In some examples, computing system 900 may be computing system 150 as shown in FIG. 1. In some examples, computing device 900 is a programming device, such as a smartphone, tablet computer, personal computer, accessory device, or other type of device.

As shown in the example of FIG. 9, computing device(s) 902 includes one or more processors 904, one or more input devices 906, one or more output devices 908, and a display 909. Computing device(s) 902 may include other components. For example, computing device 900 may include physical buttons, microphones, speakers, communication ports, and so on. Communication channel(s) 918 may interconnect each of components 902, 904, 905, 906, 908, 909, and 910 for inter-component communications (physically, communicatively, and/or operatively). In some examples, communication channel(s) 918 may include a system bus, a network connection, an inter-process communication data structure, or any other method for communicating data.

Storage device(s) 910 may store information required for use during operation of computing device 900. Storage device(s) 910 may be internal or external with respect to the computing devices 902. In some examples, storage device(s) 910 have the primary purpose of being a short-term and not a long-term computer-readable storage medium. Storage device(s) 910 may be volatile memory and may therefore not retain stored contents if powered off. Storage device(s) 910 may be configured for long-term storage of information as non-volatile memory space and retain information after power on/off cycles. In some examples, processor(s) 904 on computing device(s) 902 read and may execute instructions stored by storage device(s) 910.

Storage device(s) 910 may include an ML model 912 and algorithm(s) 914 to be applied by computing device(s) to image data 916. ML models and algorithms discussed elsewhere in this disclosure may be stored in the storage device(s).

Computing device 900 may include one or more input devices 908 that computing device 900 uses to obtain and receive image data. Examples of user input include image user input. Input device(s) 908 may include cameras.

Communication unit(s) 904 may enable computing device(s) 902 to send data to and receive data from one or more other computing devices (e.g., via a communications network, such as a local area network or the Internet). For instance, communication unit(s) 905 may be configured to receive data generated by first camera 110, receive data generated by second camera 120, receive data sent by stereoscopic imaging apparatus 130, receive and send request data, receive and send messages, send instructions to move stage 160, and so on. In some examples, communication unit(s) 905 may include wireless transmitters and receivers that enable computing device(s) 902 to communicate wirelessly with the other computing devices. For instance, in the example of FIG. 9, communication unit(s) 905 include a radio that enables computing device(s) 902 to communicate wirelessly with other computing devices. Examples of communication unit(s) 905 may include network interface cards, Ethernet cards, optical transceivers, radio frequency transceivers, or other types of devices that are able to send and receive information. Other examples of such communication units may include BLUETOOTH™, 3G, 4G, 5G, 6G, and WI-FI™ radios, Universal Serial Bus (USB) interfaces, etc. Computing devices 902 may use communication unit(s) 905 to communicate with one or more storage device(s) 910. Additionally, computing device(s) 902 may use communication unit(s) 905 to communicate with one or more other remote devices.

Output device(s) 910 may generate output. Examples of output include tactile, audio, and video output. Output device(s) 910 may include presence-sensitive screens, sound cards, video graphics adapter cards, speakers, liquid crystal displays (LCD), or other types of devices for generating output. Output device(s) 910 may include a display screen 909.

Processor(s) 902 may read instructions from storage device(s) 910 and may execute instructions stored by storage device(s) 910. Execution of the instructions by processor(s) 904 may configure or cause computing device(s) 902 to provide at least some of the functionality ascribed in this disclosure to computing system 900.

One or more of the techniques described in this disclosure may be implemented, at least in part, in hardware, software, firmware or any combination thereof. For example, various aspects of the described techniques may be implemented within one or more processors or processing circuitry, including one or more microprocessors, digital signal processors (DSPs), application specific integrated circuits (ASICs), field programmable gate arrays (FPGAs), graphics processing units (GPUs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, circuits or components may be implemented together or separately as discrete but interoperable logic devices. Depiction of different features as circuits or units is intended to highlight different functional aspects and does not necessarily imply that such circuits or units must be realized by separate hardware or software components. Rather, functionality associated with one or more circuits or units may be performed by separate hardware or software components or integrated within common or separate hardware or software components.

Various examples have been described. These and other examples are within the scope of the following claims.

What is claimed is:

1. A system for injecting a substance into a particular microscopic object of a plurality of microscopic objects, the system comprising:
    a pressure controller configured to cause a micropipette to eject the substance from a tip of the micropipette;
    a stereoscopic imaging apparatus configured to generate stereoscopic image data, wherein the stereoscopic image data comprises a stereoscopic image of the tip of the micropipette and the particular microscopic object of the plurality of microscopic objects;
    a first camera configured to generate first image data, wherein the first image data comprises a first image of the plurality of microscopic objects at a first magnification;
    a second camera configured to generate second image data, wherein the second image data comprises a second image of the particular microscopic object at a second magnification; and
    one or more computing devices configured to:
        determine, based on the stereoscopic image of the tip of the micropipette, a location of the tip of the micropipette on an x-axis, a y-axis, and a z-axis;
        apply a machine-learned model to determine, based on the first image of the plurality of microscopic objects, a location of the particular microscopic object of the plurality of microscopic objects on the x-axis and the y-axis;
        adjust a depth of focus of the second camera to focus, based on the second image of the particular microscopic object, on the particular microscopic object, wherein the depth of focus corresponds to a distance between the second camera and the particular microscopic object when the second camera focuses on the particular microscopic object;
        determine, based on the depth of focus of the second camera, the location of the particular microscopic object on the z-axis; and
        control the pressure controller to cause the micropipette to eject the substance from the tip of the micropipette and into the particular microscopic object.

2. The system of claim 1, further comprising:
    a stage configured to:
        support a container containing the plurality of microscopic objects; and
        move the container along one or more of the x-axis, the y-axis, or the z-axis; and
    wherein the computing device is further configured to control, based on the location of the tip of the micropipette and the location of the particular microscopic object, the stage to move the container such that the tip of the micropipette is embedded within the particular microscopic object.

3. The system of claim 1, wherein the one or more computing devices are further configured to:
    detect one or more features of the particular microscopic object;
    determine, based on the stereoscopic image data and the second image data, corresponding locations of the one or more features on the x-axis, the y-axis, and the z-axis; and
    determine, based on the corresponding locations of the one or more features, an injection location of the particular microscopic object on the x-axis, the y-axis, and the z-axis.

4. The system of claim 3, wherein the one or more features comprise an end of the particular microscopic object, a centroid of the particular microscopic object, or an anatomically significant part of the particular microscopic object.

5. The system of claim 1, wherein the stereoscopic image of the tip of the micropipette comprises a primary image of the tip of the micropipette from a first viewpoint and a secondary image of the tip of the micropipette from a second viewpoint.

6. The system of claim 1, wherein the first magnification is lower than the second magnification, the first camera is a digital camera, and the second camera is a microscope camera.

7. The system of claim 1, wherein the particular microscopic object is an embryo or an intact tissue.

8. The system of claim 1, wherein the one or more computing are further configured to:
- receive an indication of user input specifying a pressure of a gas; and
- control the pressure controller to inject the gas at the specified pressure into the micropipette to eject the substance from the tip of the micropipette.

9. The system of claim 1, wherein the one or more computing are further configured to:
- receive an indication of user input specifying volume of a liquid; and
- control a stepper motor to move a piston into the micropipette to eject the substance from the tip of the micropipette.

10. The system of claim 1, wherein the machine-learned model represents at least one convolutional neural network.

11. A method for injecting a substance into a particular microscopic object of a plurality of microscopic objects, the method comprising:
- generating, by a stereoscopic imaging apparatus, stereoscopic image data, wherein the stereoscopic image data comprises a stereoscopic image of a tip of a micropipette and the particular microscopic object of the plurality of microscopic objects;
- generating, by a first camera, first image data, wherein the first image data comprises a first image of the plurality of microscopic objects at a first magnification;
- generating, by a second camera, second image data, wherein the second image data comprises a second image of the particular microscopic object at a second magnification;
- determining, by a computing system comprising one or more computing devices, and based on the stereoscopic image of the tip of the micropipette, a location of the tip of the micropipette on an x-axis, a y-axis, and a z-axis;
- applying, by the computing system, a machine-learned model to determine, based on the first image of the plurality of microscopic objects, a location of the particular microscopic object of the plurality of microscopic objects on the x-axis and the y-axis;
- adjusting, by the computing system, a depth of focus of the second camera to focus, based on the second image of the particular microscopic object, on the particular microscopic object, wherein the depth of focus corresponds to a distance between the second camera and the particular microscopic object when the second camera focuses on the particular microscopic object; and
- determining, by the computing system, based on the depth of focus of the second camera, the location of the particular microscopic object on the z-axis; and controlling, by the computing system, a pressure controller to cause the micropipette to eject the substance from the tip of the micropipette and into the particular microscopic object.

12. The method of claim 11, further comprising controlling, by the computing system and based on the location of the tip of the micropipette and the location of the particular microscopic object, a stage to move a container such that the tip of the micropipette is embedded within the particular microscopic object.

13. The method of claim 11, further comprising:
- detecting, by the computing system, one or more features of the particular microscopic object;
- determining, by the computing system and based on the stereoscopic image data and the second image data, corresponding locations of the one or more features on the x-axis, the y-axis, and the z-axis; and
- determining, by the computing system and based on the corresponding locations of the one or more features, an injection location of the particular microscopic object on the x-axis, the y-axis, and the z-axis.

14. The method of claim 13, wherein the one or more features comprise an end of the particular microscopic object, a centroid of the particular microscopic object, or an anatomically significant part of the particular microscopic object.

15. The method of claim 11, wherein the stereoscopic image of the tip of the micropipette comprises a primary image of the tip of the micropipette from a first viewpoint and a secondary image of the tip of the micropipette from a second viewpoint.

16. The method of claim 11, wherein the first magnification is lower than the second magnification, the first camera is a digital camera, and the second camera is a microscope camera.

17. The method of claim 11, wherein the particular microscopic object is an embryo or an intact tissue.

18. The method of claim 11, further comprising:
- receiving, by the computing system, an indication of user input specifying a pressure of a gas; and
- controlling, by the computing system, the pressure controller to inject the gas at the specified pressure into the micropipette to eject the substance from the tip of the micropipette.

19. The method of claim 11, further comprising:
- receiving, by the computing system, an indication of user input specifying a volume of a liquid; and
- controlling, by the computing system, a stepper motor to move a piston into the micropipette to eject the substance from the tip of the micropipette.

20. The method of claim 11, wherein the machine-learned model represents at least one convolutional neural network.

* * * * *